(12) United States Patent
Munechika

(10) Patent No.: US 9,182,843 B2
(45) Date of Patent: Nov. 10, 2015

(54) TOUCH PANEL CONTROLLER AND SEMICONDUCTOR DEVICE

(71) Applicant: Renesas SP Drivers Inc., Kodaira-shi, Tokyo (JP)

(72) Inventor: Isao Munechika, Kodaira (JP)

(73) Assignee: SYNAPTICS DISPLAY DEVICES GK, Tokyo (JP)

( * ) Notice: Subject to any disclaimer, the term of this patent is extended or adjusted under 35 U.S.C. 154(b) by 31 days.

(21) Appl. No.: 14/246,049

(22) Filed: Apr. 5, 2014

(65) Prior Publication Data

US 2014/0313146 A1   Oct. 23, 2014

(30) Foreign Application Priority Data

Apr. 22, 2013 (JP) .................. 2013-089238

(51) Int. Cl.
*G06F 3/041* (2006.01)
*G06F 1/32* (2006.01)
*G06F 3/044* (2006.01)

(52) U.S. Cl.
CPC .............. *G06F 3/041* (2013.01); *G06F 1/3262* (2013.01); *G06F 3/044* (2013.01); *G06F 3/0416* (2013.01)

(58) Field of Classification Search
CPC ....... G06F 3/041; G06F 3/044; G06F 3/0416; G06F 3/0412; G09G 1/00; G09G 3/3648
See application file for complete search history.

(56) References Cited

U.S. PATENT DOCUMENTS

2011/0032201 A1*   2/2011   Naka ............................ 345/173

FOREIGN PATENT DOCUMENTS

JP           2011-039709 A       2/2011

* cited by examiner

*Primary Examiner* — Michael Faragalla
(74) *Attorney, Agent, or Firm* — Miles & Stockbridge P.C.

(57) ABSTRACT

The drive circuit operable to output a drive pulse pattern to drive electrodes of a touch panel is arranged so that it can change the pulse frequency of the drive pulse pattern for each drive electrode. The detection circuit operable to detect signal changes arising on detection electrodes of the touch panel for each drive pulse pattern output by the drive circuit is arranged so that it can change the sampling frequency of signal change for each detection electrode. The range to make higher the pulse frequency of the drive pulse pattern for each drive electrode, and the sampling frequency of signal change for each detection electrode is variably controlled according to a touch position where a touch has been detected by use of a detection signal detected by the detection circuit.

27 Claims, 14 Drawing Sheets

Fig.10

| No. | MEASUREMENT TIME t[ms] | TOUCH X COORDINATE | TOUCH Y COORDINATE |
|---|---|---|---|
| 1 | 0 | 5 | 20 |
| 2 | 5 | 6 | 15 |
| 3 | 10 | 8 | 12 |
| 4 | 15 | 17 | 8 |
| 5 | 20 | 22 | 12 |
| 6 | 25 | 30 | 21 |

[DETECTED TOUCH COORDINATE]

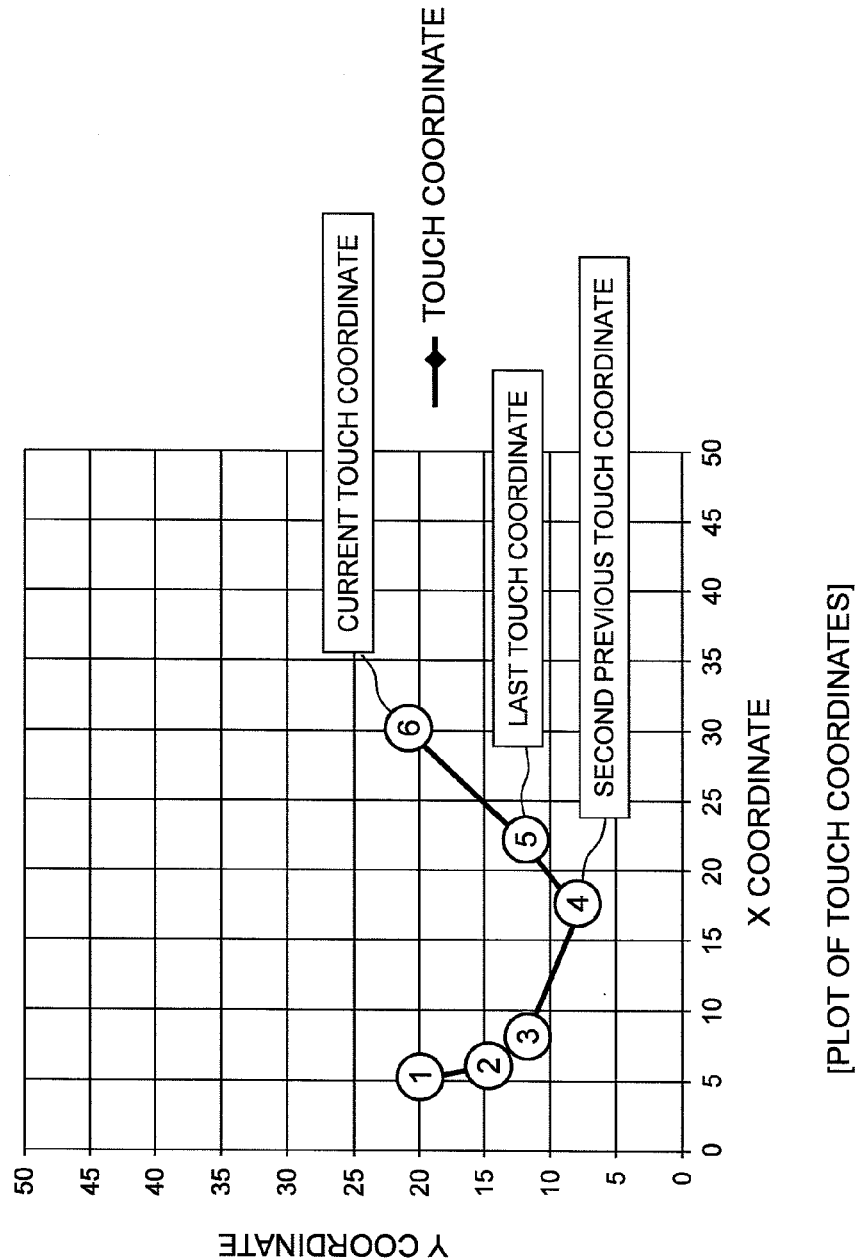

Fig.12

| No. | MEASUREMENT TIME t [ms] | TOUCH X COORDINATE | TOUCH Y COORDINATE | TOUCH X COORDINATE THREE-POINT AVERAGE OF MOVEMENT | TOUCH Y COORDINATE THREE-POINT AVERAGE OF MOVEMENT | TOUCH X COORDINATE 3-POINT σ | TOUCH X COORDINATE 3σ High | TOUCH X COORDINATE 3σ Low | TOUCH X COORDINATE 3-POINT σ | TOUCH Y COORDINATE 3σ High | TOUCH Y COORDINATE 3σ Low |
|---|---|---|---|---|---|---|---|---|---|---|---|
| 1 | 0 | 5 | 20 | | | | | | | | |
| 2 | 5 | 6 | 15 | | | | | | | | |
| 3 | 10 | 8 | 12 | 9.5 | 8 | 1.4 | 12.2 | 3.8 | 2.1 | 18.4 | 5.6 |
| 4 | 15 | 17 | 8 | 22.5 | 4.5 | 5.9 | 34.6 | -0.6 | 3.5 | 18.5 | -2.5 |
| 5 | 20 | 22 | 12 | 29 | 12 | 7.1 | 43.3 | 0.7 | 2.3 | 18.9 | 5.1 |
| 6 | 25 | 30 | 21 | 36.5 | 27.5 | 6.6 | 49.7 | 10.3 | 6.7 | 41.0 | 1.0 |

[AVERAGE OF MOVEMENT, RESULT OF CALCULATION FOR STANDARD DEVIATIONS]

TOUCH PANEL CONTROLLER AND SEMICONDUCTOR DEVICE

CROSS-REFERENCE TO RELATED APPLICATIONS

The Present application claims priority from Japanese application JP 2013-089238 filed on Apr. 22, 2013, the content of which is hereby incorporated by reference into this application.

BACKGROUND

The present invention relates to a touch panel controller operable to control a touch panel, and a semiconductor device having a touch panel controller, and a technique useful in application to a driver IC for e.g. display driving of a panel module with a touch panel incorporated in a liquid crystal display panel, and the touch detection control thereof.

For the purpose of increasing the accuracy of touch detection by a touch sensor, in the case of a mutual capacitance detection method, for example, the following are adequate to raise the frequency of a drive pulse for driving drive electrodes, and a sampling frequency of signal changes arising on detection electrodes as a result of this, and to increase the number of touch detections for each display frame. However, in case that the detection accuracy is kept high at all times, a large power will be consumed even with no touch.

Hence, by making faster the coordinate sampling cycle right after the start of touch when a flick operation can be performed and at the time when a drag operation is made faster, and setting a slow coordinate sampling cycle for other periods, the coordinate sampling can be performed at a minimum required speed. For instance, the coordinate sampling process is performed with a short (fast) coordinate sampling cycle t1 until a predetermined length of time has elapsed after the start of touch, whereas the sampling process is performed with a coordinate sampling cycle t2 which is longer (slower) than t1 after the predetermined length of time has elapsed. In case that the moving speed of a finger which touches the touch panel is increasing even after an elapse of the predetermined length of time, the sampling process is performed with the short coordinate sampling cycle t1 again.

The display control method like this is disclosed in e.g. Japanese Unexamined Patent Application Publication No. JP-A-2011-039709.

SUMMARY

By making faster the coordinate sampling cycle right after the start of touch when a flick operation can be performed, and at the time when a drag operation is made faster, and setting a slow coordinate sampling cycle for other periods as described in JP-A-2011-039709, the accuracy of touch detection can be increased while achieving a lower power consumption. However, there has been the problem that the increase in the speed of the coordinate sampling cycle is just made on an entire face of a touch panel, and thus the sampling frequency is made higher at all of detection coordinates and therefore, electric power is consumed uselessly at many touch coordinates where no touch is detected in fact.

It is an object of the invention to reduce the power consumption for touch detection while enhancing the touch detection performance of a touch panel.

The above and other object of the invention, and novel features thereof will become apparent from the description hereof and the accompanying drawings.

Of the embodiments herein disclosed, the representative embodiment will be briefly outlined below.

That is, the drive circuit operable to output a drive pulse pattern to drive electrodes of a touch panel is arranged so that it can change the pulse frequency of the drive pulse pattern for each drive electrode. The detection circuit operable to detect signal changes arising on detection electrodes of the touch panel for each drive pulse pattern output by the drive circuit is arranged so that it can change the sampling frequency of signal change for each detection electrode. The range to make higher the pulse frequency of the drive pulse pattern for each drive electrode, and the sampling frequency of signal change for each detection electrode is variably controlled according to a touch position where a touch has been detected by use of a detection signal detected by the detection circuit.

Of the embodiment herein disclosed, the representative embodiment brings about the effect as briefly described below.

The range to raise the pulse frequency and the sampling frequency is variably controlled according to a touch position where a touch has been detected. Both the pulse frequency and the sampling frequency are never raised uniformly over the whole face of a touch panel and thus, low power consumption can be achieved. In addition, a high level accuracy of touch detection can be ensured in consideration of the continuity of touch. Therefore, the power consumption for touch detection can be suppressed while increasing the touch detection performance of a touch panel.

BRIEF DESCRIPTION OF THE DRAWINGS

FIG. 10 is an explanatory diagram showing, by example, coordinates determined from a total six times of sensing every 30 ms;

FIG. 11 is an explanatory diagram in which the coordinates of FIG. 10 are plotted showing points of the coordinates with x-axis drawn in a horizontal direction and y-axis in a vertical direction;

FIG. 12 is an explanatory diagram showing, by example, an average of movement and a standard deviation which are determined with the coordinates of FIG. 11;

DETAILED DESCRIPTION

1. Summary of the Embodiments

Figure 1:
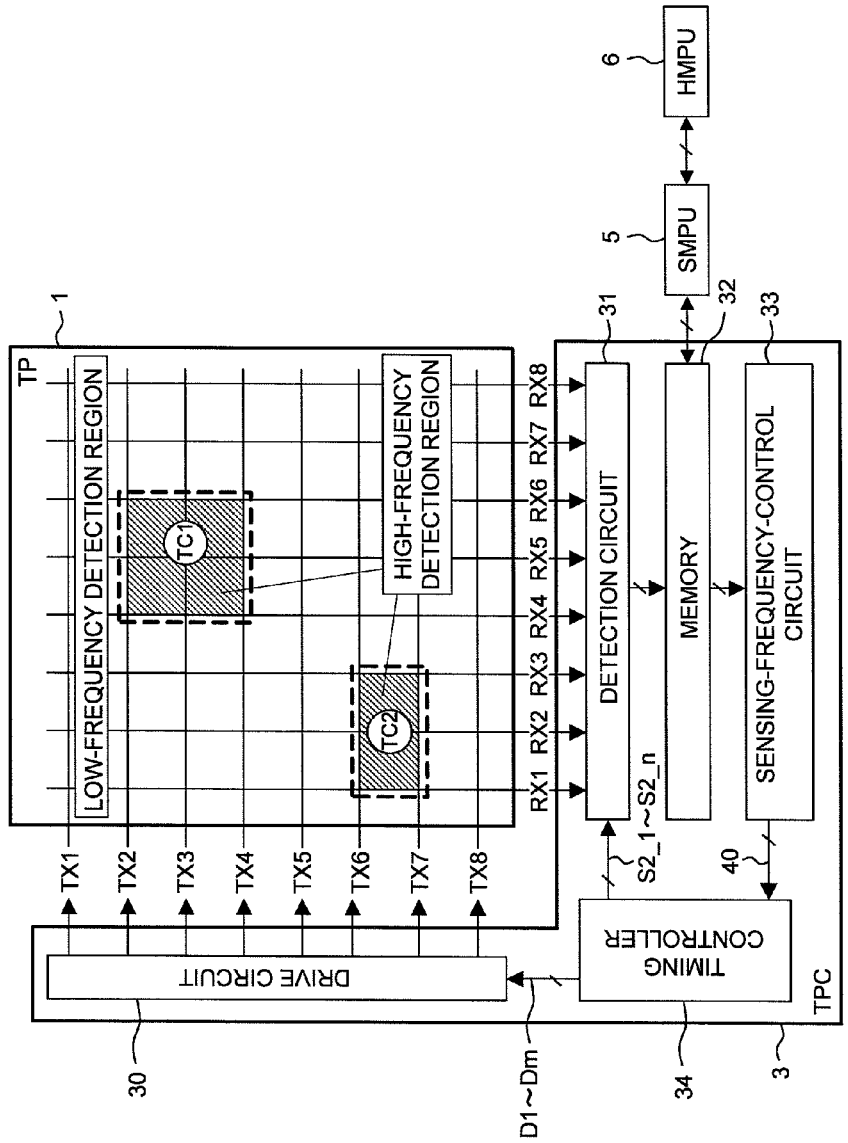
FIG. 1 is an explanatory diagram showing, by example, a first example of a touch panel controller.

First, summary of representative embodiments of the invention disclosed in the application will be described. Reference numerals in drawings in parentheses referred to in description of the summary of the representative embodiments just denote components included in the concept of the components to which the reference numerals are designated.

[1] <Variable control of the ranges to raise the pulse frequency of a drive pulse pattern and a sampling frequency of signal changes according to a detected touch position within>

The touch panel controller (3) has: a drive circuit (30) operable to sequentially output a drive pulse pattern to drive electrodes (TX1 to TXm) of a touch panel; a detection circuit (31) operable to detect signal changes arising on detection electrodes (RX1 to RXn) of a touch panel for each drive pulse pattern output by the drive circuit; and a control circuit (33 to 34, or 34 to 37) operable to control the drive circuit and the detection circuit. The drive circuit is capable of changing a pulse frequency of the drive pulse pattern for each drive electrode. The detection circuit is capable of changing a sampling frequency of signal change for each detection electrode. The control circuit controls, within a predetermined range, a pulse frequency of the drive pulse pattern for each drive electrode, and a sampling frequency of signal change for each detection electrode so as to raise the pulse and sampling frequencies, provided that the predetermined range can be changed depending on a touch position where a touch has been detected by use of a detection signal detected by the detection circuit.

According to the embodiment like this, a range which raises the pulse frequency of a drive pulse pattern, and a sampling frequency of signal change is variably controlled according to a touch position where a touch has been detected. Therefore, both of the pulse frequency and the sampling frequency are never raised uniformly all over the face of the touch panel. The range in which the pulse frequency and the sampling frequency are both raised corresponds to a touch position where a touch has been detected. Therefore, a high level accuracy of touch detection can be ensured in consideration of the continuity of touch. Thus, the power consumption for touch detection can be suppressed while increasing the touch detection performance of a touch panel.

Figure 5:
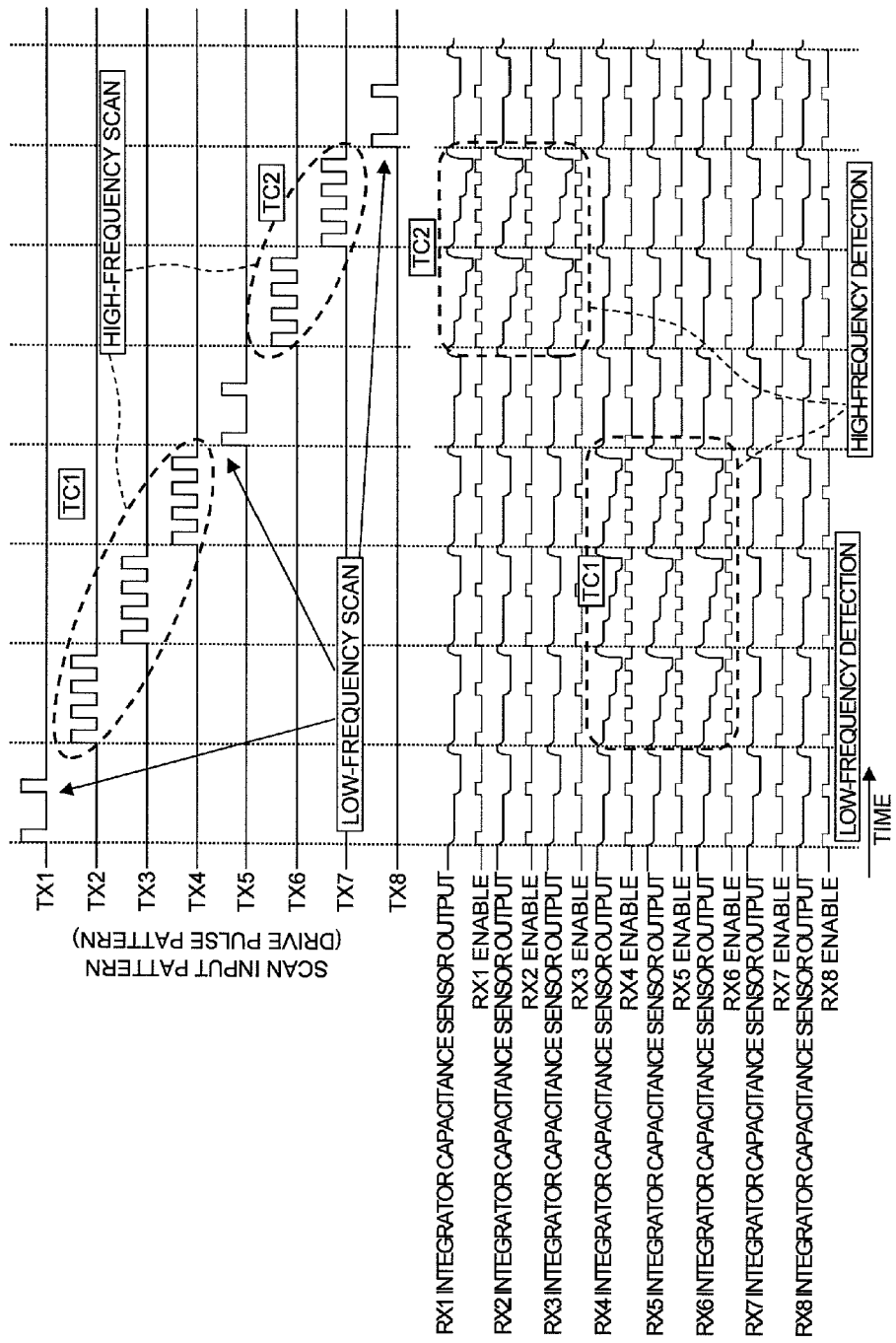
FIG. 5 is a timing waveform diagram showing a first example of a form of high-frequency driving by a timing controller.

[2] <FIG. 5; To raise the pulse frequency of a drive pulse pattern and the sampling frequency only near a touch position>

In the touch panel controller as described in [1], the control circuit makes a pulse frequency of the drive pulse pattern a first pulse frequency, and a sampling frequency of signal change a first sampling frequency until a touch position is acquired. On condition that the control circuit acquires and keeps a touch position, a pulse frequency of the drive pulse pattern for the drive electrodes depending on the predetermined range is a second pulse frequency higher than the first pulse frequency, and a sampling frequency of signal change from the detection electrode depending on the predetermined range is a second sampling frequency higher than the first sampling frequency.

According to the embodiment like this, the pulse frequency of a drive pulse pattern and the sampling frequency can be raised only near a touch position. Therefore, the touch panel controller hereof is superior in low power consumption.

Figure 6:
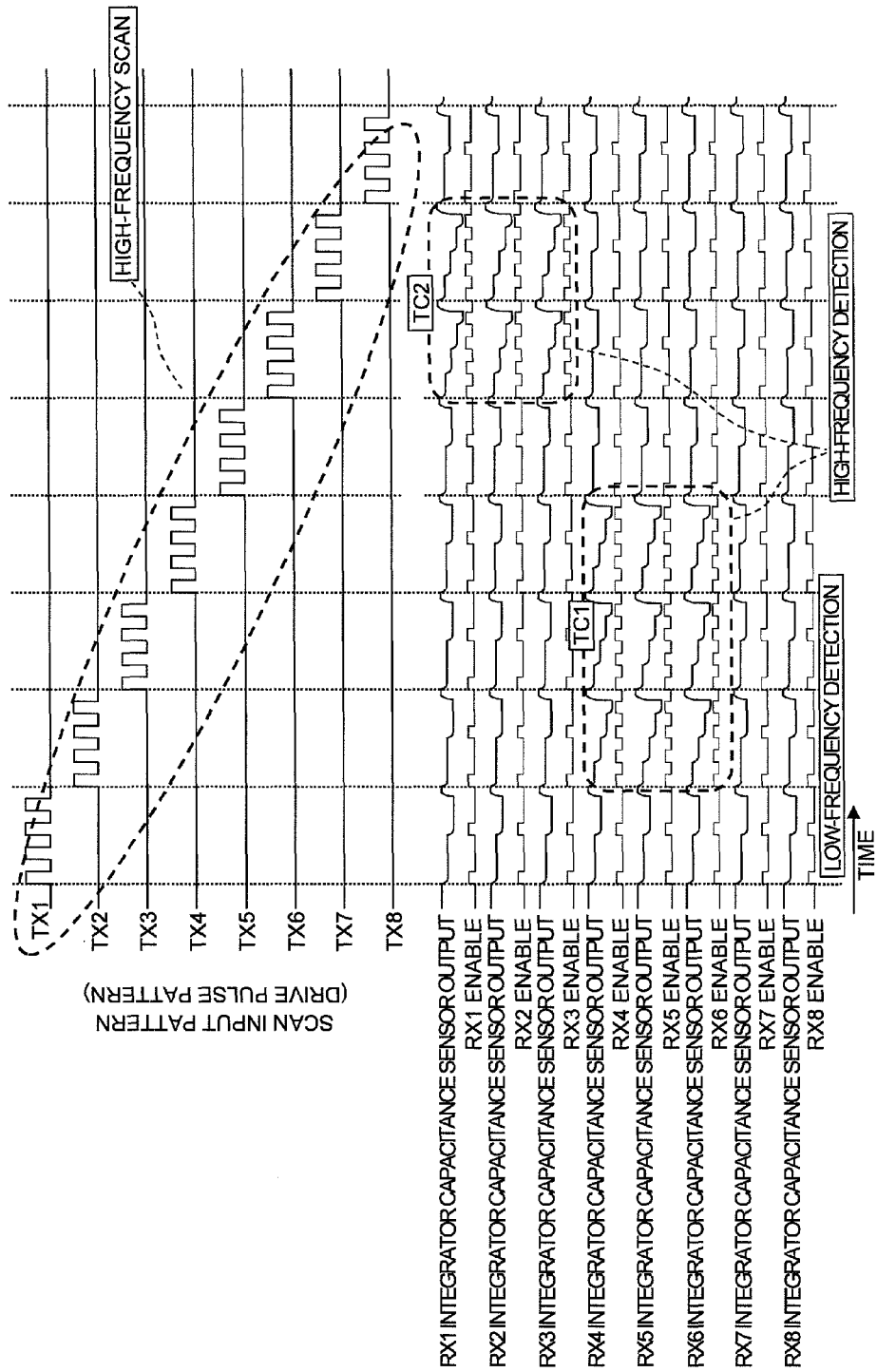
FIG. 6 is a timing waveform diagram showing a second example of a form of high-frequency driving by a timing controller.

[3] <FIG. 6; To raise the pulse frequency of all the drive pulse patterns, and raise the sampling frequency only near a touch position>

In the touch panel controller as described in [1], the control circuit makes a pulse frequency of the drive pulse pattern a first pulse frequency, and a sampling frequency of signal change a first sampling frequency until a touch position is acquired. On condition that the control circuit acquires and keeps a touch position, a pulse frequency of the drive pulse pattern for all the drive electrodes is a second pulse frequency higher than the first pulse frequency, and a sampling frequency of signal change from the detection electrode depending on the predetermined range is a second sampling frequency higher than the second sampling frequency.

According to the embodiment like this, the pulse frequencies of all the drive pulse patterns can be raised, and the sampling frequency can be raised only near the touch position. The control is made easier in because the need for controlling the frequencies for each drive pulse pattern is eliminated.

Figure 7:
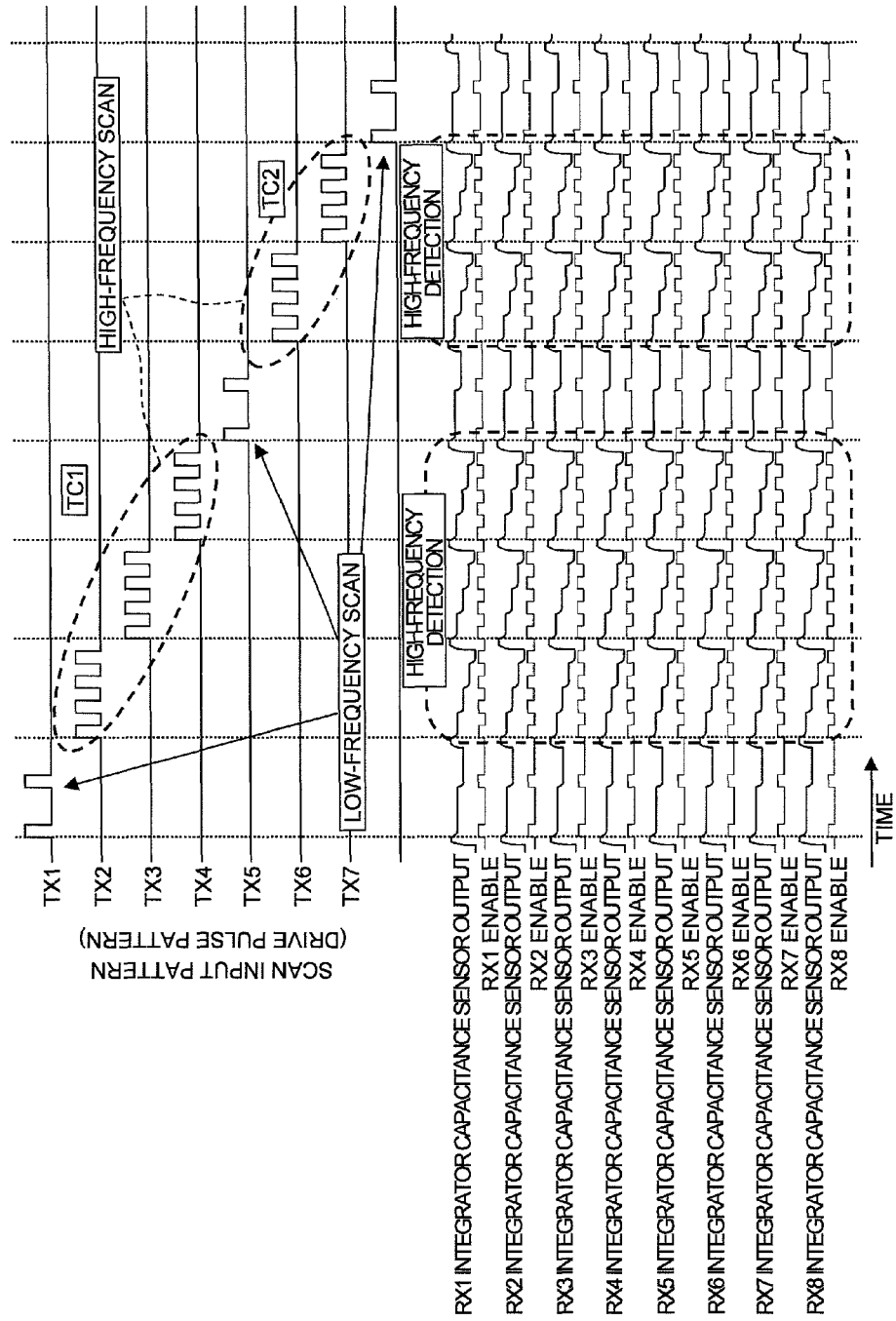
FIG. 7 is a timing waveform diagram showing a third example of a form of high-frequency driving by the timing controller.

[4] <FIG. 7; To raise the pulse frequency of the drive pulse pattern only near a touch position, and raise the sampling frequency of signal change according thereto>

In the touch panel controller as described in [1], the control circuit makes a pulse frequency of the drive pulse pattern a first pulse frequency, and a sampling frequency of signal change a first sampling frequency until a touch position is acquired. On condition that the control circuit acquires and keeps a touch position, a pulse frequency of the drive pulse pattern for the drive electrodes depending on the predetermined range is a second pulse frequency higher than the first pulse frequency; and a sampling frequency of signal change which the detection circuit detects corresponding to the drive pulse pattern by the second pulse frequency is a second sampling frequency which is higher than the first sampling frequency.

According to the embodiment like this, the following are made possible: to raise the pulse frequency of the drive pulse pattern only near a touch position; and to raise only the sampling frequency of signal change according thereto. The need for controlling the sampling frequency for each signal electrode is eliminated, which makes the control easier.

[5] <Restore the high-frequency driving in case that a new touch position is not acquired until a predetermined length of time elapses after high-frequency driving>

In the touch panel controller as described in any one of [2] to [4], the control circuit makes a pulse frequency of the drive pulse pattern the second pulse frequency, and changes a sampling frequency of signal change of the detection circuit to the second sampling frequency. In case that the control circuit cannot acquire a new touch position until a predetermined length of time has elapsed, the control circuit returns a pulse frequency of the drive pulse pattern which has been the second pulse frequency to the first pulse frequency, and returns the sampling frequency which has been the second sampling frequency to the first sampling frequency. The case that the control circuit cannot acquire a new touch position until a predetermined length of time has elapsed means the situation that a new touch position is not detected after the transition of the touch panel from the state of being touched to the state of being untouched as a matter of course. It also means the situation that the touch position remains staying at an unchanged coordinate point even after an elapse of a predetermined length of time.

According to the embodiment like this, even in case that a new touch position is not acquired until a predetermined length of time elapses after the high-frequency driving, the high-frequency driving can be restored. Hence, a high level accuracy of touch detection is never maintained uselessly, and in this respect, the touch panel controller is superior in low power consumption.

[6] <To gradually reduce the predetermined range in size and then, restore the pulse frequency and the sampling frequency before restoring the high-frequency driving>

In the touch panel controller as described in any one of [2] to [4], the control circuit makes a pulse frequency of the drive pulse pattern the second pulse frequency, and makes a sampling frequency of signal change of the detection circuit a second sampling frequency. After that, in case that the control circuit cannot acquire a new touch position each time a predetermined length of time elapses, the control circuit successively makes smaller the predetermined range on each occasion thereby to adapt itself to the reduced range, and then returns back, to the first pulse frequency, the pulse frequency of a drive pulse pattern forming part of the drive pulse patterns which have been the second pulse frequency, and returns back, to the first sampling frequency, the sampling frequency forming part of the sampling frequencies which have been the second sampling frequency. At the time when finally, the number of elapses of the predetermined length of time reaches a final round number, the control circuit returns pulse frequencies of all the drive pulse patterns to the first pulse frequencies, and returns all the sampling frequencies to the first sampling frequencies, and in case that the control circuit obtains a new touch position on its way to the final round number, the control circuit performs control so as to return, back to its initial range, the predetermined range for raising the pulse frequency of the drive pulse pattern and the sampling frequency of signal change. The situation that the control circuit cannot acquire a new touch position each time a predetermined length of time elapses means that no touch position can be detected since the transition of the touch panel from the state of being touched to the state of being untouched as a matter of course, but it also means that each time the predetermined length of time elapses the touch position remains staying at the same coordinate. In either situation, it is sufficient to e.g. gradually reducing a range of high-frequency driving which centers at a touch position to an appropriate size with time, instead of returning all the regions back to the low-frequency driving after an elapse of the predetermined length of time.

According to the embodiment like this, the pulse frequency and the sampling frequency can be restored by gradually reducing the predetermined range in size before restoring the high-frequency driving. The pulse frequency and the sampling frequency are gradually restored, and therefore a high level accuracy of touch detection is not maintained uselessly. The resultant touch panel controller is superior in low power consumption further than the touch panel controller as described in [5].

[7] <Next touch-prediction range>

In the touch panel controller as described in [1], the predetermined range is a next touch-prediction range calculated from touch positions nearest acquired.

According to the embodiment like this, the pulse frequency of the drive pulse pattern and the sampling frequency of signal change are both raised in the next touch-prediction range, whereby the probability that the next touch position falls in a high-frequency detection region can be increased.

[8] <Next touch-prediction range; Range which centers at a current position and is two or more times as large as the standard deviation>

In the touch panel controller as described in [7], the next touch-prediction range is a range which centers at a touch position acquired just before, and is two or more times as large as the standard deviation calculated from touch positions nearest acquired.

According to the embodiment like this, the probability of the next touch position is in a prediction range for high-frequency detection can be made higher from the viewpoint of statistics.

[9] <Next touch-prediction range; Range centering at a position predicted by extrapolation and having a size two or more times as large as the standard deviation>

In the touch panel controller as described in [8], the next touch-prediction range has further a range added thereto, which centers at a touch position predicted by the predetermined extrapolation to a touch position acquired just before and is two or more times as large as the standard deviation.

According to the embodiment like this, the probability of the next touch position put in a prediction range for high-frequency detection can be increased from the viewpoint of statistics in addition to the prediction by extrapolation.

[10] <Next touch-prediction range; Predetermined range centering at a position predicted by extrapolation>

In the touch panel controller as described in [7], the next touch-prediction range is a predetermined range which centers at a touch position predicted by the predetermined extrapolation to a touch position acquired just before.

According to the embodiment like this, the probability of the next touch position put in a prediction range for high-frequency detection can be increased from the viewpoint of prediction by extrapolation.

[11] <Semiconductor device having a processor for execution of a coordinate calculation, and a touch panel controller>

The semiconductor device includes a touch panel controller as described in [1], and a processor (5) operable to calculate a coordinate of a touch position by use of a detection signal detected by the detection circuit, in which the control circuit acquires a touch position calculated by the processor.

According to the embodiment like this, the load of the arithmetic calculation process of a touch position by use of detection signals can be put on the processor. Therefore, the load of the arithmetic calculation process on the host processor can be lightened.

[12] <Semiconductor device further having a display controller>

The semiconductor device as described in [11] further includes a display controller (4) operable to perform display control of the display panel. The touch panel controller controls the touch panel in synchronization with the display control by the display controller.

According to the embodiment like this, it becomes easier to control both of a touch panel and a display panel in synchronization with the aid of a semiconductor device.

[13] <Variably control a range to raise the pulse frequency and the sampling frequency according to a touch position where a touch has been detected, and then restore the pulse frequency and the sampling frequency according to no touch after that>

The touch panel controller (3) has: a drive circuit (30) operable to output a drive pulse pattern to drive electrodes (TX1 to TXm) of a touch panel sequentially; a detection circuit (31) operable to detect signal changes arising on detection electrodes (RX1 to RXn) of a touch panel for each drive pulse pattern output by the drive circuit; and a control circuit (33 to 34, or 34 to 37) operable to control the drive circuit and the detection circuit. The drive circuit is capable of changing the pulse frequency of the drive pulse pattern for each drive electrode. The detection circuit is capable of changing a sampling frequency of signal change for each detection electrode. The control circuit uses, as initial values, the pulse frequency of the drive pulse pattern for each drive electrode and the sampling frequency of signal change for each detection electrode until it acquires a touch position where a touch has been detected by use of detection signals from the detection circuit. After having acquired a touch position, the control circuit controls, within a predetermined range which is made variable depending on the touch position, the pulse frequency of the drive pulse pattern for each drive electrode, and the sampling frequency of signal change for each detection electrode to become higher than the initial values. After that, with the touch position remaining unchanged, the control circuit returns the pulse frequency of the drive pulse pattern and the sampling frequency of signal change back to the initial values. The situation that the touch position remains unchanged means the situation that a new touch position cannot be detected after the transition from the state of being touched to the state of being untouched as a matter of course, but it also means the situation that the touch position stays at the same coordinate even after an elapse of a predetermined length of time. On condition that the touch position remains unchanged, e.g. a range to raise the sampling frequency, which centers at the touch position, may be gradually reduced to an appropriate size with time instead of returning the sampling frequency on all the regions back to the initial value after an elapse of the predetermined length of time.

According to the embodiment like this, a range to raise the pulse frequency of a drive pulse pattern and the sampling frequency of signal change are variably controlled according to a touch position where a touch has been detected. Both the pulse frequency and the sampling frequency are never raised uniformly over the whole face of a touch panel. Further, the range in which the pulse frequency and the sampling frequency are both raised depends on a touch position where a touch has been detected and therefore, a high level accuracy of touch detection can be ensured in consideration of the continuity of touch. Further, in case that after the high-frequency driving, a new touch position cannot be acquired until a predetermined length of time has elapsed, the high-frequency driving can be restored and as such, a high level accuracy of touch detection is never maintained uselessly. In this respect, the touch panel controller is superior in low power consumption.

[14] <Gradual widening of a predetermined range to restore the pulse frequency and the sampling frequency>

In the touch panel controller as described in [13], the control circuit gradually widens a range to return the pulse frequency of the drive pulse pattern and the sampling frequency of signal change back to their initial values by stepwise narrowing the predetermined range with time on condition that a touch position remains unchanged.

According to the embodiment like this, the pulse frequency and the sampling frequency are gradually restored, and a high level accuracy of touch detection is never maintained uselessly. Therefore, the resultant touch panel controller is superior in low power consumption further than the touch panel controller as described in [5].

[15] <Predetermined range of initial values; the whole range of the touch panel>

In the touch panel controller as described in [13] or [14], the initial value of the predetermined range is the whole range of the touch panel.

According to the embodiment like this, wherever what type of operation of a flick and a drag is performed, a high level accuracy of touch detection can be ensured.

[16] <The size to stepwise narrow the predetermined range to; Register setting>

In the touch panel controller as described in [13] or [14], the size to stepwise narrow the predetermined range to can be changed by setting of a register to which an access from outside can be made.

According to the embodiment like this, it becomes possible to make an optimum setting according to an action mode such as a low power consumption mode or high-speed working mode

[17] <Variable control of a range to raise the pulse frequency and the sampling frequency according to a prediction range predicted based on a touch position>

The touch panel controller (3) has: a drive circuit (30) operable to output drive pulse patterns to drive electrodes (TX1 to TXm) of a touch panel sequentially; a detection circuit (31) operable to detect signal changes arising on detection electrodes (RX1 to RXn) of a touch panel for each drive pulse pattern output by the drive circuit; and a control circuit (33 to 34, or 34 to 37) operable to control the drive circuit and the detection circuit. The drive circuit is capable of changing a pulse frequency of the drive pulse pattern for each drive electrode. The detection circuit is capable of changing a sampling frequency of signal change for each detection electrode. The control circuit uses, as initial values, the pulse frequency of the drive pulse pattern for each drive electrode, and the sampling frequency of signal change for each detection electrode until the control circuit obtains a touch position where a touch has been detected by use of detection signals provided by the detection circuit. After having obtained a touch position, the control circuit variably controls both the pulse frequency of the drive pulse pattern for each drive electrode, and the sampling frequency of signal change for each detection electrode to become higher frequencies within a predetermined range which is made variable depending on the prediction from the previous touch position obtained by use of detection signals from the detection circuit according to a subsequent touch position predicted based on the previous touch position.

According to the embodiment like this, a range to raise the pulse frequency of a drive pulse pattern and the sampling frequency of signal change is variably controlled according to a touch position where a touch has been detected. Therefore, both of the pulse frequency and the sampling frequency are never raised uniformly over the whole face of a touch panel. The range to raise both the pulse frequency and the sampling frequency depends on a position predicted from a touch position already obtained. Hence, a high level accuracy of touch detection can be ensured in consideration of the continuity of touch.

[18] <Next touch-prediction range>

The touch panel controller as described in [17], The predetermined range to variably control is a next touch-prediction range calculated from touch positions nearest acquired.

According to the embodiment like this, the accuracy of a position predicted from touch positions already obtained can be increased.

[19] <Next touch-prediction range; Range which is centers at a current position and is two or more times as large as the standard deviation>

In the touch panel controller as described in [18], the next touch-prediction range is a range which centers at a touch position acquired just before and is two or more times as large as the standard deviation calculated from touch positions nearest acquired.

According to the embodiment like this, the probability of a next touch position put in a prediction range for high-frequency detection can be increased from the viewpoint of statistics.

[20] <Next touch-prediction range; Range which centers at a position predicted by extrapolation and is two or more times as large as the standard deviation>

In the touch panel controller as described in [19], the next touch-prediction further includes a range added thereto, which centers at a touch position predicted by the predetermined extrapolation to a touch position acquired just before and is two or more times as large as the standard deviation.

According to the embodiment like this, the probability of a next touch position put in a prediction range for high-frequency detection can be increased from the viewpoint of statistics in consideration of the prediction by extrapolation.

[21] <Next touch-prediction range; Predetermined range centering at a position predicted by extrapolation>

In the touch panel controller as described in [18], the next touch-prediction range is a predetermined range which centers at a touch position predicted by the predetermined extrapolation on a touch position acquired just before.

According to the embodiment like this, the probability of a next touch position put in a prediction range for high-frequency detection can be increased in consideration of the prediction by extrapolation.

2. Further Detailed Description of the Embodiments

The embodiments will be described further in detail.
<<Display Device>>

Figure 2:
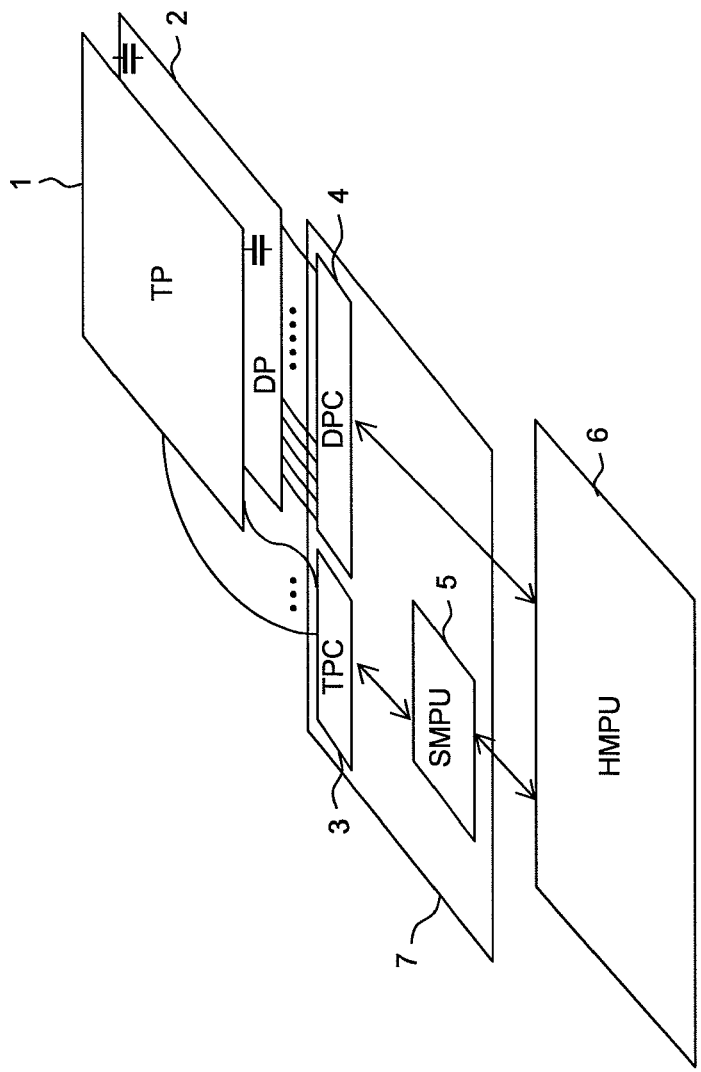
FIG. 2 is a configuration diagram showing, by example, a display device applied to a portable information terminal device such as a tablet or a smart phone.

FIG. 2 shows, by example, a display device which is applicable to a portable information terminal device such as a tablet or a smart phone. The portable information terminal device shown in the drawing has, on a surface of its housing, e.g. a dot matrix type display panel (DP)2 arranged by use of liquid crystal or the like with a touch panel (TP) 1 incorporated therein; the touch panel allows touch detection according to the mutual capacitance technique. The structure of the incorporation may be any of an external attachment structure, an integrated in-cell structure and the like as long as the detection plane of the touch panel 1 is laid on the display plane of the display panel 2.

While not particularly shown in the drawing, the display panel 2 has e.g. a thin-film transistor arranged at each intersection point of the display scan electrodes and display-signal electrodes arranged to intersect one another, and referred to as "TFT". The thin-film transistors each have a gate connected to the display scan electrode, a source connected to the display-signal electrode, and a drain connected to a common electrode through a liquid crystal element and a storage capacitor, which constitute a sub-pixel, whereby respective pixels are formed. In display control, the display scan electrodes are driven sequentially, the thin-film transistors are turned ON for each display scan electrode, and thus current is caused to flow between the source and drain of the TFT concerned. The signal voltages supplied to the sources through display-signal electrodes at this time are applied to the liquid crystal elements, whereby the gradation control is performed.

While not particularly shown in the drawing, the touch panel 1 has e.g. a detection capacitance formed at each intersection point of drive electrodes and detection electrodes, which are arranged to intersect one another. The touch panel integrates signal changes arising on the detection electrodes through the detection capacitances while the drive electrodes are driven sequentially to form detection signals. In case that a finger is located close to the detection capacitance, the stray capacitance of the finger is combined with the detection capacitance, and thus the combined capacitance value becomes smaller. The touch panel is arranged so that the differentiation between touch and no touch can be made based on a difference in the detection signal according to the change in capacitance value.

A subprocessor (SMPU) 5 performs the judgment on touch/no touch based on the detection signal, and the calculation of touch coordinates, etc. which lightens the load to a host processor (HMPU) 6. The host processor 6 provides a touch panel controller 3 with an action command for touch detection and a parameter for the action of touch detection. Also, the host processor 6 supplies a display controller 4 with a display command and display data. After having taken touch coordinate data calculated by the subprocessor 5, the host processor 6 is allowed to discriminate a touch operation such as a multipoint touch performed on the touch panel 1 according to screen display of the display panel 2. Although no special restriction is intended, a portable information terminal device can be arranged by connecting a communication control unit, an image-processing unit, an audio-processing unit, and other units including an accelerator, which are not shown in the drawing, to the host processor 6.

The touch panel controller 3, the display controller 4, and the subprocessor 5 are formed on a semiconductor substrate in the form of a semiconductor device 7, for example.

<<the Drive Circuit and the Detection Circuit of the Touch Panel Controller>>

Figure 3:
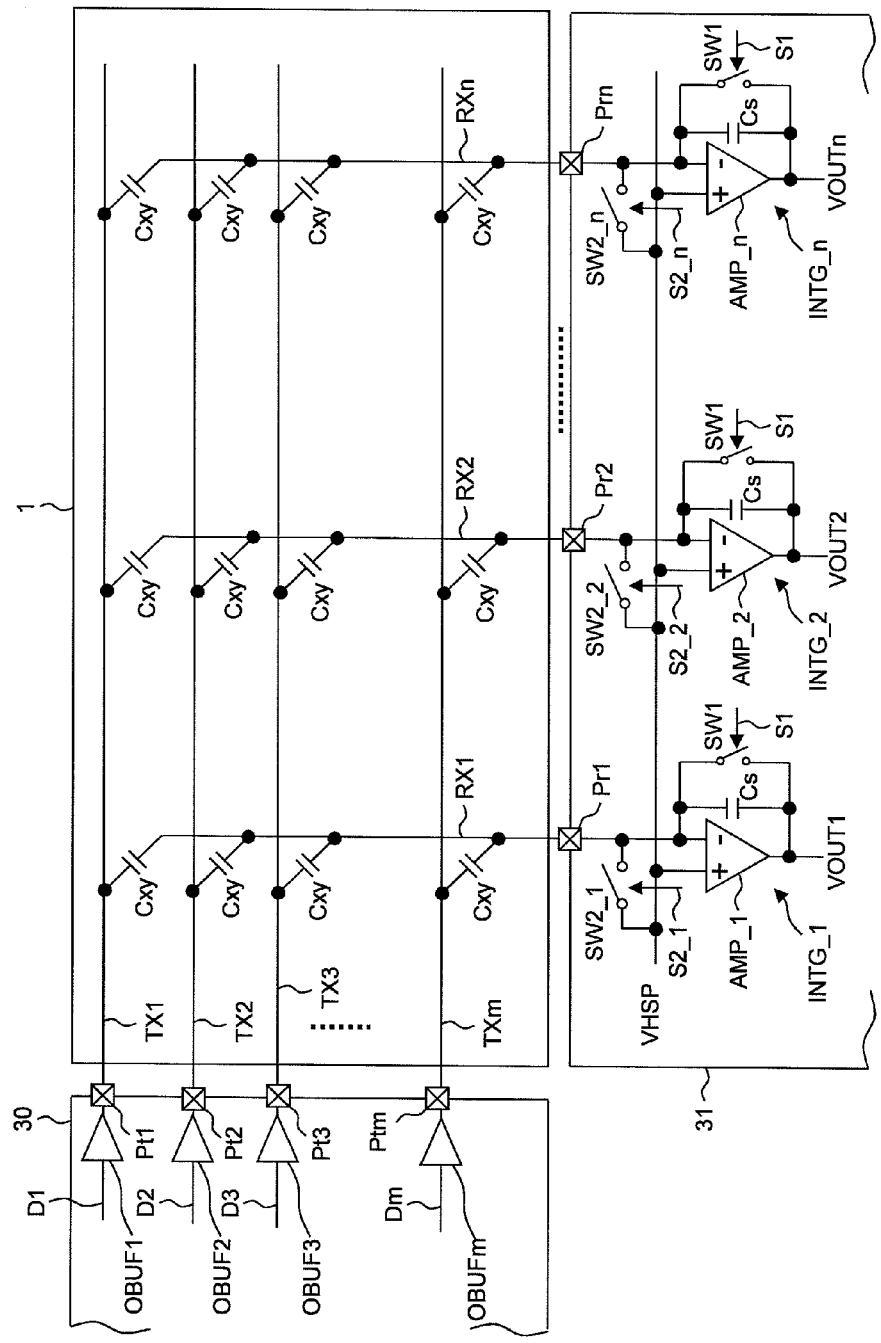
FIG. 3 is a circuit diagram showing, by example, a drive circuit of the touch panel controller and a detection circuit thereof.

FIG. 3 shows, by example, the drive circuit and the detection circuit of the touch panel controller.

The touch panel 1 has a number of drive electrodes TX1 to TXm formed in its crosswise direction, and a number of detection electrodes RX1 to RXn formed in its lengthwise direction, which are electrically insulated from one another, and further node capacitances Cxy formed at crossing parts of the drive electrodes TX1 to TXm and the detection electrodes RX1 to RXn. With an object such as a finger put close to the node capacitance Cxy, a stray capacitance having a capacitance electrode made by the object is added to the node capacitance Cxy.

A drive circuit 30 of the touch panel controller 3 outputs a drive pulse pattern, which is applied to the drive electrodes TX1 to TXm through drive terminals Pt1 to Ptm in the order of the drive electrodes arrayed. In this way the drive electrodes TX1 to TXm are driven by pulses. Although no special restriction is intended, the frequencies of drive pulse patterns output from output buffers OBUF1 to OBUFm of the drive circuit 30 can be controlled based on drive-control signals D1 to Dm for each of the drive electrodes TX1 to TXm. The detail of the control is to be described later.

The detection electrodes RX1 to RXn are connected to a detection circuit 31 of the touch panel controller 3 through detection terminals Pr1 to Prn. The detection circuit has integration circuits INTG_1 to INTG_n which are provided for the detection electrodes RX1 to RXn respectively. The integration circuits INTG_1 to INTG_n are identical to one another in structure, and each includes: a switch SW2_$i$ for applying a precharge voltage VHSP to the corresponding detection electrode RXi(i=1–n); an operational amplifier AMP_i; an integrating capacitor Cs; and a switch SW1 for resetting the integrating capacitor Cs. The switch SW1 is a switch for resetting an electric charge built up by the capacitor Cs used for the detection. The switches SW1 are all controlled by a switch signal S1 common to them. The switches SW2_1 to SW2_$n$ are controlled by switch signals S2_1 to S2_$n$ respectively. For instance, the level which an output VOUT_i of the integration circuit INTG_i has reached is used as a detection signal depending on touch/no touch after repeating a series of the actions of: pre-charging the detection electrode RXi with the switch SW2_$i$ staying in ON state; turning OFF the switch SW2_$i$; driving the drive electrodes by pulses; and integrating a potential change arising on the detection electrode in the pulse waveform by means of the integration circuit INTG_i. Although no special restriction is intended, the frequencies of the sampling action by the integration circuits INTG_1 to INTG_n according to ON/OFF of the switches SW2_1 to SW2_$n$ can be controlled for each of the integration circuits INTG_1 to INTG_n based on switch signals S2_1 to S2_$n$. The control is to be described later in detail.

Now, it is noted that Pt1 to Ptm each denote a drive terminal used as an external terminal connected to corresponding one of the drive electrodes TX1 to TXm, and Pr1 to Prn each denote a detection terminal used as an external terminal connected to corresponding one of the detection electrodes RX1 to RXn.

Figure 4:
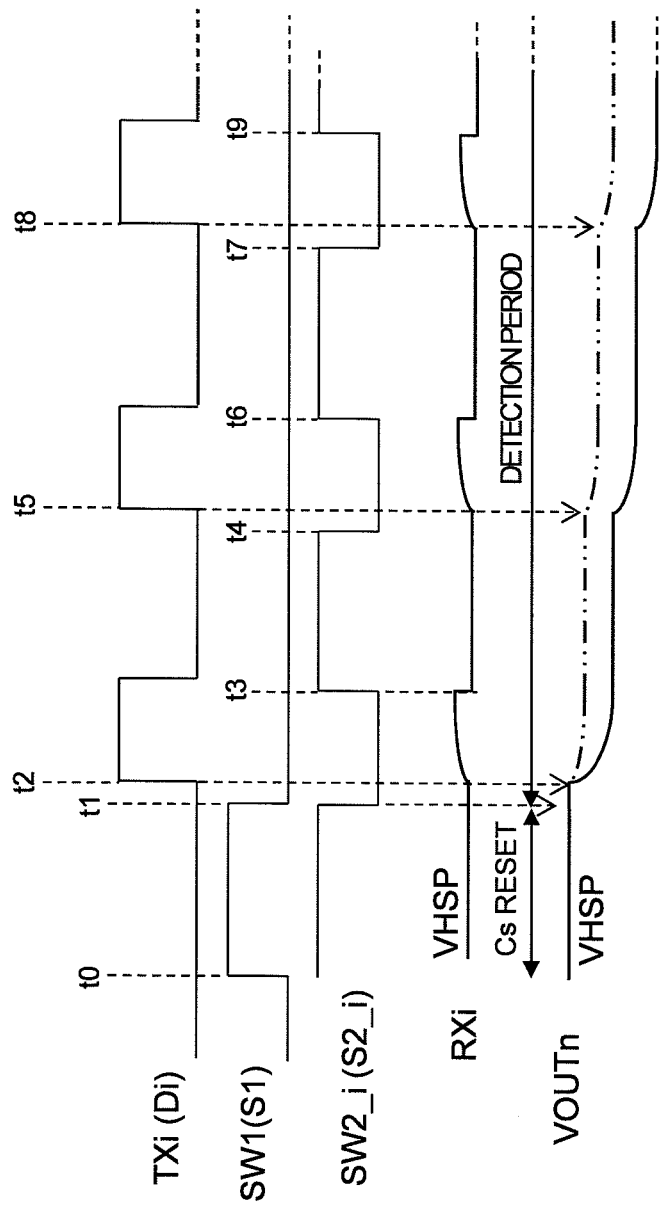
FIG. 4 is a timing diagram showing, by example, waveforms in the integrating action by an integration circuit.

FIG. 4 shows, by example, waveforms in the integrating action by the integration circuit INTG_i. First, at the time t0, the switch SW2_$i$ is turned ON in response to the High level of the switch signal S2_$i$ and thus, a precharge voltage VHSP is supplied to the corresponding detection electrode RXi, whereas the switch SW1 is turned ON in response to the High level of the switch signal S1 and thus, the capacitor Cs is reset. Next, at the time t1, the switches SW1 and SW2_$i$ are turned OFF (the switch signal S1 is made Low level, and S2_$i$ is made Low level). As a result, the detection electrode RXi is disconnected from the precharge voltage VHSP, whereas the voltage level of the inverting input terminal (−) of the operational amplifier AMP_i, which is arranged to electrically connect to a virtual ground, is held as it is. After that, at the time t2, the first rising pulse of a drive pulse pattern (having a crest value Vx) is input to the drive electrode TXi (The other drive electrodes remain fixed to Low level). Consequently, an electric charge (=Vx×Cxy) moves to the detection electrodes RX1 to RXn through the node capacitances Cxy on the drive electrode TXi. The output voltages VOUT1 to VOUTn of the operational amplifiers AMP_1 to AMP_n which receive the electric charge at the inverting input terminals (−) lower by a voltage depending on the electric charge thus moved. After that, at the time t3, the switch SW2$i$ is turned ON, and the precharge voltage VHSP is applied to the inverting input terminal (−) of the amplifier AMP_i. Then, during the time from the time t3 to t9, the same integrating action is repeated. In FIG. 4, the waveforms of one operational amplifier AMP_i as the representative one are shown. In the integrating action, if a finger is present near the crossing part, the stray capacitance attributed thereto reduces the capacitance value of the node capacitance Cxy. For instance, supposing that the capacitance value of the node capacitance Cxy is reduced by a capacitance value Cf at the crossing part of the detection electrode RXi, the electric charge input to the operational amplifier AMP_i of the detection electrode RXi is given by Vx×(Cxy−Cf), and the decrease in the level of the output VOUTi of the operational amplifier AMP_i becomes smaller than that in a case in which no finger is present near the crossing part as shown by a chain line. The process as described above is repeated the same number of times as the number of pulses depending on the pulse pattern of the drive pulse. The differences of an AD conversion value (detection data) from the levels which the output voltages VOUT1 to VOUTn have reached as a result of the repetition allow touch and no touch to be differentiated from each other. The detection data are stored in the memory in which the detection data are mapped according to their detection positions, e.g. the subprocessor 5 makes judgment about whether or not the touch panel is being touched based on the detection data thus stored and in that case, the subprocessor calculates touch coordinates on the touch panel.

The touch panel controller 3 controls a pulse frequency of the drive pulse pattern for each of the drive electrodes TX1 to TXm, and the sampling frequency of the integration circuits (INTG_1 to INTG_n) for each of the detection electrodes RX1 to RXn within a predetermined range which is made variable depending on a touch coordinate calculated by the subprocessor 5 to be high frequencies, thereby materializing the function of reducing the power consumed for touch detection while enhancing the touch detection performance. The function will be described below in detail.

<<To Raise the Drive Pulse Frequency and the Sampling Frequency Near Touch Coordinates>>

FIG. 1 shows a first configuration example of the touch panel controller 3. The touch panel controller 3 has: a drive circuit 30; a detection circuit 31; a memory 32; a sensing-frequency-control circuit 33; and a timing controller 34. The sensing-frequency-control circuit 33 and the timing controller 34 each form one example of a control circuit of the touch panel controller 3. Although no special restriction is intended, the number of the drive electrodes is 8 (m=8), and the number of the detection electrodes is 8 (n=8) in the case of FIG. 1.

As described above, the drive circuit 30 is capable of changing a pulse frequency of the drive pulse pattern for each of the drive terminals Pt1 to Ptm.

In addition to the integration circuits INTG_1 to INTG_n which have been described with reference to FIG. 3, the detection circuit 31 includes such as an AD conversion circuit operable to perform an analog-to-digital conversion of outputs of integration circuits INTG_1 to INTG_n. As described above, the detection circuit 31 can change the sampling frequency (i.e. integrating action frequency) of the integration circuit for each of the detection terminals Pr1 to Prn.

The memory 32 has: a memory region (detection data memory region) for temporarily storing detection data sequentially obtained by the detection circuit for each touch detection frame of mapping according to detection positions; and a memory region (touch coordinate storing region) for storing touch coordinates calculated by the subprocessor 5 for each touch detection frame; with no touch, non-touch data are stored therein (The touch coordinates of touch detection frames retraced to the past from the latest touch detection frame are stored in the touch coordinate storing region. As to a touch detection frame in the case of non-touch, non-touch data are held therein. For instance, the touch coordinate storing region is composed of a FIFO buffer having FIFO stages corresponding to touch detection frames. Now, "FIFO" herein stands for "First In-First Out").

According to a result of the calculation stored in the detection data memory region of the memory, the sensing-frequency-control circuit 33 creates high-frequency detection region (also referred to as "high-frequency region" simply)

designation data 40 for designating a drive terminal range for raising a pulse frequency of the drive pulse pattern, and a detection terminal range for raising the sampling frequency of the integration circuit. The drive terminal range for raising the pulse frequency, and the detection terminal range for raising the sampling frequency are e.g. a range of a calculated touch coordinate plus and minus up to three terminals. One concrete example will be taken here. Supposing that touch coordinates in the event of two-point touch are TC1, TC2, the drive terminal ranges on condition that the high-frequency region designation data 40 designates a high frequency wave are TX2 to TX4, and TX6 to TX7, and the detection terminal ranges on condition that the high-frequency region designation data 40 designates a high frequency wave are RX1 to RX3, and RX4 to RX6. In case that the result of the calculation stored in the detection data memory region is non-touch, the high-frequency designation data will designate a low frequency wave for positions of all the drive terminals and all the detection terminals.

For instance, the timing controller 34 sequentially drives the drive electrodes TX1 to TX8 according to a drive pulse pattern so as to obtain touch detection data of one or more touch detection frames for each display frame according to the display controller 4, and controls the integrating action of the integration circuit connected to each of the detection electrodes RX1 to RX8 in synchronization with the pulse driving of the drive electrodes. During the process like this, the drive pulse frequency of the drive circuit 30, and the detection sampling frequency of the detection circuit 31 are each made a high frequency within a range designated by the high-frequency region designation data 40. The drive pulse frequency is controlled by the drive-control signals D1 to Dm, and the sampling frequency is controlled by the switch signals S2_1 to S2__n. The lengths of time for pulse driving with respect to each of the drive electrodes TX1 to TX8 are controlled to become fixed regardless of the pulse frequency. Therefore, low-frequency drive pulses to be applied to the drive electrodes TX1 to TX8 differ from high-frequency drive pulses to be applied to the drive electrodes in the number of the pulses. In addition, the sampling frequency to be applied to the detection electrodes RX1 to RX8 is also the switching frequency of the switches SW2_1 to SW2__n and as such, the number of executions of sampling varies between low and high sampling frequencies.

The timing waveform diagram of FIG. 5 shows a first example of the form of high-frequency driving by the timing controller 34. In FIG. 5, an RX1 enable is grasped as a reversed-phase signal of the switch signal S2_1. In short, the high level of the RX1 enable turns the corresponding switch SW_1 OFF.

In FIG. 5, the high-frequency driving is performed in regions coincident or overlapping with a drive electrode range and a detection electrode range which are designated by the high-frequency region designation data 40. For instance, with high-frequency region designation data 40 in FIG. 1, the following are conducted so as to coincide with the hatched regions of FIG. 1: the step of performing the high-frequency sampling on the integration circuits INTG_4, INTG_5, and INTG_6 corresponding to the detection electrodes RX4, RX5, and RX6 in driving the drive electrodes TX2, TX3, and TX4 with a high frequency; and the step of performing the high-frequency sampling on the integration circuits INTG_1, INTG_2, and INTG_3 corresponding to the detection electrodes RX1, RX2, and RX3 in driving the drive electrodes TX6 and TX7 with a high frequency. In the case of FIG. 1, the hatched regions on the detection plane of the touch panel are made the high-frequency detection regions, and other regions are made low-frequency detection regions. Now, it is noted that the drive frequency of high-frequency waves is double that of low-frequency pulses, and the sampling frequency of high-frequency waves is double that of low-frequency waves.

The timing waveform diagram of FIG. 6 shows a second example of the form of high-frequency driving by the timing controller 34. In FIG. 6, the drive electrodes are all driven with high frequency pulses, and the high-frequency driving is performed on only the detection electrode ranges designated by the high-frequency region designation data 40. With e.g. the high-frequency region designation data 40 for the touch panel controller as shown in FIG. 1, the following are conducted: the step of driving all the drive electrodes TX1 to TX8 with high frequency pulses; the step of performing the high-frequency sampling on the integration circuits INTG_4, INTG_5, and INTG_6 of the detection electrodes RX4, RX5, and RX6 in driving the drive electrodes TX2 to TX4 designated by the high-frequency region designation data 40; and in addition, the step of performing the high-frequency sampling on the integration circuits INTG_1, INTG_2, and INTG_3 of the detection electrodes RX1, RX2, and RX3 in driving the drive electrodes TX6 and TX7. The relation of the high frequency waves with the low-frequency waves is the same as that in the form of high-frequency driving of the first example of FIG. 5.

The timing waveform diagram of FIG. 7 shows a third example of the form of high-frequency driving by the timing controller 34. In FIG. 7, the high-frequency driving is performed on the drive electrodes in a drive electrode range designated by the high-frequency region designation data 40; the high-frequency sampling is performed on all the detection electrodes in response to the driving of the drive electrodes to be driven with high frequency pulses. With e.g. the high-frequency region designation data 40 for the touch panel controller as shown in FIG. 1, the high-frequency sampling is performed on the integration circuits INTG_1 to INTG_8 of all of the detection electrodes RX1 to RX8 in driving the drive electrodes TX2, TX3, and TX4 with high-frequency pulses. In driving the drive electrodes TX6 and TX7 with high-frequency pulses, the high-frequency sampling is performed on the integration circuits INTG_1 to INTG_8 of all of the detection electrodes RX1 to RX8. The relation of the high frequency waves with the low-frequency waves is the same as that in the form of high-frequency driving of the first example of FIG. 5.

In the forms of high-frequency driving of FIGS. 5 to 7, the timing controller 34 may be arranged as to stop the high-frequency driving and return to the total low-frequency driving in case that a new touch position cannot be obtained until a predetermined length of time (e.g. a period of more than one detection frame) has elapsed after the start of the high-frequency driving with the pulse frequency of a drive pulse pattern to the drive electrodes, and high-frequency sampling on the integration circuits corresponding to the detection electrodes. The predetermined length of time like that may be measured by a timer, otherwise a required detection-frame period may be determined by measuring a vertical synchronizing signal. The fact that a new touch position cannot be obtained implies any of the following three situations. The first is the touch panel remains untouched. The second is the touch panel becomes untouched after detection of touch, and then remains untouched. The third is a touch position is kept staying at the same coordinate even after a predetermined length of time has elapsed.

According to these arrangements, even though a new touch position cannot be obtained until a predetermined length of time has elapsed after the high-frequency driving, the accuracy of touch detection is not kept uselessly high as long as the restoration from the high-frequency driving is allowed. In this respect, a touch panel controller superior in terms of low power consumption is materialized.

In addition, the pulse frequency and the sampling frequency may be restored by making the ranges designated by the high-frequency region designation data 40 smaller gradually before the restoration from the high-frequency driving as described above. That is, in the following three cases that the first is the touch panel remains untouched, the second is the touch panel becomes untouched after detection of touch and then remains untouched, and the third is a touch position is kept staying at the same coordinate even after a predetermined length of time has elapsed, the driving form on all of the regions targeted for the high-frequency driving is not restored to the low-frequency driving form after the predetermined length of time, and e.g. a range of the high-frequency driving centering at a touch position may be gradually made smaller to an appropriate size as time passes. The timing for gradually narrowing a high-frequency region may be each time a timer measures the predetermined length of time, or each time a number of detection-frame periods elapses. The ranges to be narrowed actually may be controlled so as to gradually reduce the numbers of the drive electrodes and the detection electrodes in ranges designated by the high-frequency region designation data 40.

According to these arrangements, the pulse frequency and the sampling frequency are gradually restored, and the accuracy of touch detection is not kept uselessly high. In this respect, a touch panel controller superior in terms of low power consumption is materialized.

The first example of FIG. 1, in which the drive pulse frequency and the sampling frequency are raised near a touch coordinate, brings about the effect and advantage as described below.

(1) Both of the pulse frequency and the sampling frequency are never raised uniformly over the whole face of a touch panel. This is because the range in which the pulse frequency of a drive pulse pattern and a sampling frequency of signal change are both raised is variably controlled according to a touch position where a touch has been detected. Further, the range in which the pulse frequency and the sampling frequency are both raised is controlled according to a touch position where a touch has been detected. Therefore, a high level accuracy of touch detection can be ensured in consideration of the continuity of touch. Thus, the power consumption for touch detection can be suppressed while increasing the touch detection performance of a touch panel.

(2) A touch panel controller superior in terms of low power consumption can be materialized. This is because the pulse frequency of a drive pulse pattern and the sampling frequency can be raised only near a touch position by performing the high-frequency driving so as to raise the pulse frequency of a drive pulse pattern and the sampling frequency only near a touch position as in the embodiment described with reference to FIG. 5.

(3) The need for controlling the drive pulse frequency for each drive pulse pattern is eliminated by raising the pulse frequencies of all of drive pulse patterns and performing the high-frequency driving so as to raise the sampling frequency only near a touch position as in the embodiment described with reference to FIG. 6. In this respect, the control of the timing controller 34 is easier than that in the embodiment described with reference to FIG. 5.

(4) The need for performing high-frequency control of the sampling frequency for each signal electrode is eliminated by raising the pulse frequency of a drive pulse pattern only near a touch position, and a sampling frequency of signal change in response thereto as in the embodiment described with reference to FIG. 7. In this respect, the control of the timing controller 34 is easier than that in the embodiment described with reference to FIG. 5.

<<High-Frequency Driving in a Next Touch-Prediction Range>>

Next, an embodiment of the touch panel controller which is arranged so that a region to increase the detection accuracy on can be reduced to a necessary minimum by predicting a subsequent touch coordinate position from touch coordinates taken immediately before, and setting the pulse drive frequency of a previously predicted range and the sampling cycle to high frequencies, and which brings further progress in reduction in power consumption by touch sensing will be described.

Figure 8:
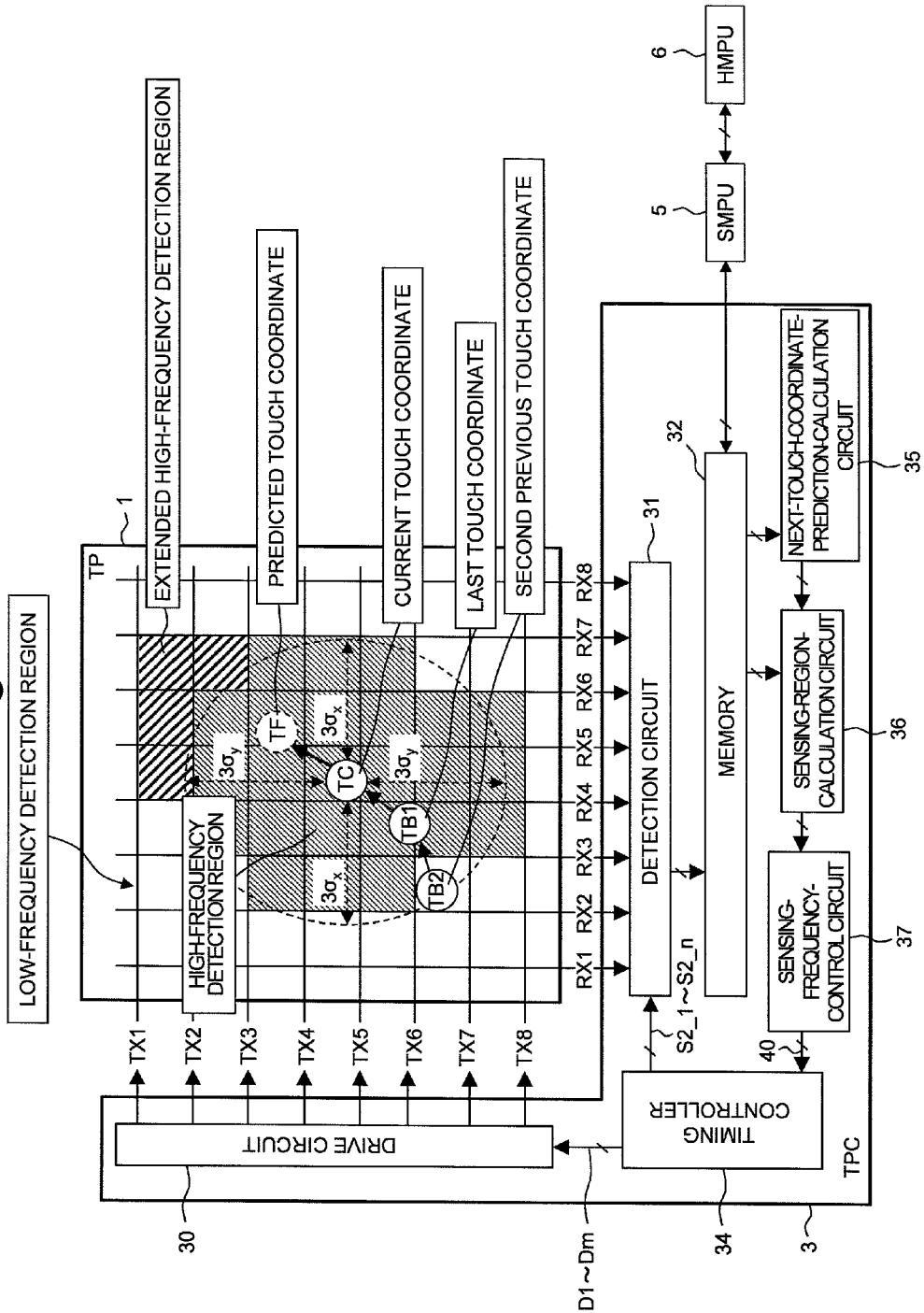
FIG. 8 is an explanatory diagram showing a second example of the touch panel controller.

FIG. 8 shows a second configuration example of the touch panel controller 3. The touch panel controller of the drawing is different from that of FIG. 1 in that the touch panel controller of FIG. 8 has, as control circuits, a next-touch-coordinate-prediction-calculation circuit 35, a sensing-region-calculation circuit 36, and a sensing-frequency-control circuit 37. Especially, in the embodiment of FIG. 8, a touch position in the touch panel 1 is a position of not two-point touch as in FIG. 1, but one-point touch for easy understanding.

In this example, the touch coordinates of touch detection frames retraced to the past from the latest touch detection frame are stored in the touch coordinate storing region of the memory 32. As to a touch detection frame in the case of non-touch, non-touch data are held therein. For instance, the touch coordinate storing region is composed of a FIFO buffer having FIFO stages corresponding to touch detection frames. Now, "FIFO" herein stands for "First In-First Out". The touch coordinate storing region holds e.g. a current touch coordinate TC, a last touch coordinate TB1, and a second previous touch coordinate TB2.

The sensing-region-calculation circuit 36 calculates standard deviations $\sigma_x$, and $\sigma_y$ from three points of touch coordinates (the current touch coordinate TC, the last touch coordinate TB1, and the second previous touch coordinate TB2) taken immediately before.

Supposing the second previous touch coordinate TB2 ($x_{b2}$, $y_{b2}$), the last touch coordinate TB1 ($x_{b1}$, $Y_{b1}$) and the current touch coordinate TC ($x_c$, $y_c$) a combination of standard deviations $\sigma_x$, $\sigma_y$ are given by:

$$x \text{ AVERAGE } m_x = \frac{x_{b2} + x_{b1} + x_c}{3}$$

$$y \text{ AVERAGE } m_y = \frac{y_{b2} + y_{b1} + y_c}{3}$$

$$x \text{ STANDARD DEVIATION } \sigma_x = \sqrt{\frac{(x_{b2} - m_x)^2 + (x_{b1} - m_x)^2 + (x_c - m_x)^2}{3}}$$

$$y \text{ STANDARD DEVIATION } \sigma_y = \sqrt{\frac{(y_{b2} - m_y)^2 + (y_{b1} - m_y)^2 + (y_c - m_y)^2}{3}}$$

The next-touch-coordinate-prediction-calculation circuit 35 predicts and calculates a next touch coordinate from three-point touch coordinates (i.e. a current touch coordinate TC, a last touch coordinate TB1, and a second previous touch coordinate TB2) taken immediately before according to an extrapolation method.

Supposing the second previous touch coordinate TB2($x_{b2}$, $y_{b2}$), the last touch coordinate TB1($x_{b1}$, $y_{b1}$), and the current touch coordinate TC($x_c$, $y_c$), a predicted touch coordinate TF($x_f$,$y_f$) can be determined from the following two formulas, in which e.g. an average of movement among three points is used.

$$x \text{ MOVEMENT AVERAGE } M_x = \frac{(x_c - x_{b1}) + (x_{b1} - x_{b2})}{2} = \frac{x_c - x_{b2}}{2}$$

$$y \text{ MOVEMENT AVERAGE } M_y = \frac{(y_c - y_{b1}) + (y_{b1} - y_{b2})}{2} = \frac{y_c - y_{b2}}{2}$$

PREDICTED TOUCH COORDINATE $$x_f = x_c + M_x$$

$$y_f = y_c + M_y$$

The sensing-frequency-control circuit 37 uses, according to an action mode, required data of a current touch coordinate obtained from the memory 32, a standard deviation from the sensing-region-calculation circuit 36, and a predicted touch coordinate from the next-touch-coordinate-prediction-calculation circuit 35, thereby creating high-frequency designation data 40.

In the first creation form of high-frequency designation data 40, data for designating a drive terminal range and a detection terminal range in a range centering at a current touch coordinate TC and extending to $3\sigma_x$, $3\sigma_y$ are created. According to the example of FIG. 8, the range of the drive terminals on condition that a high frequency wave is designated by the high-frequency region designation data 40 is TX2 to TX8, and the range of the detection terminals on condition that a high frequency wave is designated by the high-frequency region designation data 40 is RX2 to RX7.

In the second creation form of the high-frequency designation data 40, data for designating a range which is arranged by adding a drive terminal range and a detection terminal range located in a range centering on a surrounding region around a predicted touch coordinate TF and extending to e.g. $2\sigma_x$, $2\sigma_y$ to a range of the drive terminals and a range of the detection terminals in a range centering at the current touch coordinate TC and extending to $3\sigma_x$, $3\sigma_y$ are created. The high-frequency detection region shown in FIG. 8 is a range obtained based on $3\sigma_x$, $3\sigma_y$, and the extended high-frequency region means a range extrapolated beyond the high-frequency detection region.

According to the example of FIG. 8, the drive terminal range on condition that the high-frequency region designation data 40 designates a high-frequency wave is TX1 to TX8, and the detection terminal range on condition that the high-frequency region designation data 40 designates a high-frequency wave is RX2 to RX7.

In the third creation form of the high-frequency designation data 40, data for designating a drive terminal range and a detection terminal range located in a region centering on a surrounding region around the predicted touch coordinate TF, and extending to e.g. $2\sigma_x$ and $2\sigma_y$ are created. According to the embodiment of FIG. 8, the drive terminal range is TX1 to TX6 on condition that high-frequency region designation data 40 designates a high-frequency wave, and the detection terminal range on condition that the high-frequency region designation data 40 designates a high-frequency wave is RX3 to RX7.

The range two or more times as large as the standard deviation is not limited to triple nor twice. It can be changed appropriately. In addition, its multiple may be variable depending on the parameter setting on a parameter register (not shown) which the sensing-frequency-control circuit 37 holds.

For instance, the timing controller 34 sequentially drives the drive electrodes TX1 to TX8 according to a drive pulse pattern so that touch detection data of one or more touch detection frames can be obtained for each display frame arranged by the display controller 4, and controls the integrating action of the integration circuits connected to the detection electrodes RX1 to RX8 in synchronization with the pulse driving of the drive electrodes. During this process, the drive pulse frequency of the drive circuit 30 and the detection sampling frequency of the detection circuit 31 are made high frequencies within ranges designated by the high-frequency region designation data 40. The drive pulse frequency is controlled by the drive-control signals D1 to Dm, and the sampling frequency is controlled by the switch signals S2_1 to S2_n. The high-frequency driving based on the high-frequency region designation data 40 may be arranged in any of the following forms. In the first form, only a range designated by the high-frequency designation data is targeted for the high-frequency driving as described with reference to FIG. 5. In the second form, the high-frequency driving is performed so as to raise the pulse frequency of all of drive pulse patterns, and to raise the sampling frequency only in a range designated by the high-frequency designation data 40 as described with reference to FIG. 6. In the third form, the high-frequency driving is performed so as to raise the pulse frequency of a drive pulse pattern only in a range designated by the high-frequency designation data 40, and to raise a sampling frequency of signal change according to it as described with reference to FIG. 7. What driving form to select may be changed by setting a mode on the mode register of the timing controller 34. Alternatively, the driving form may be fixed to any one of the high-frequency driving forms.

Figure 9:
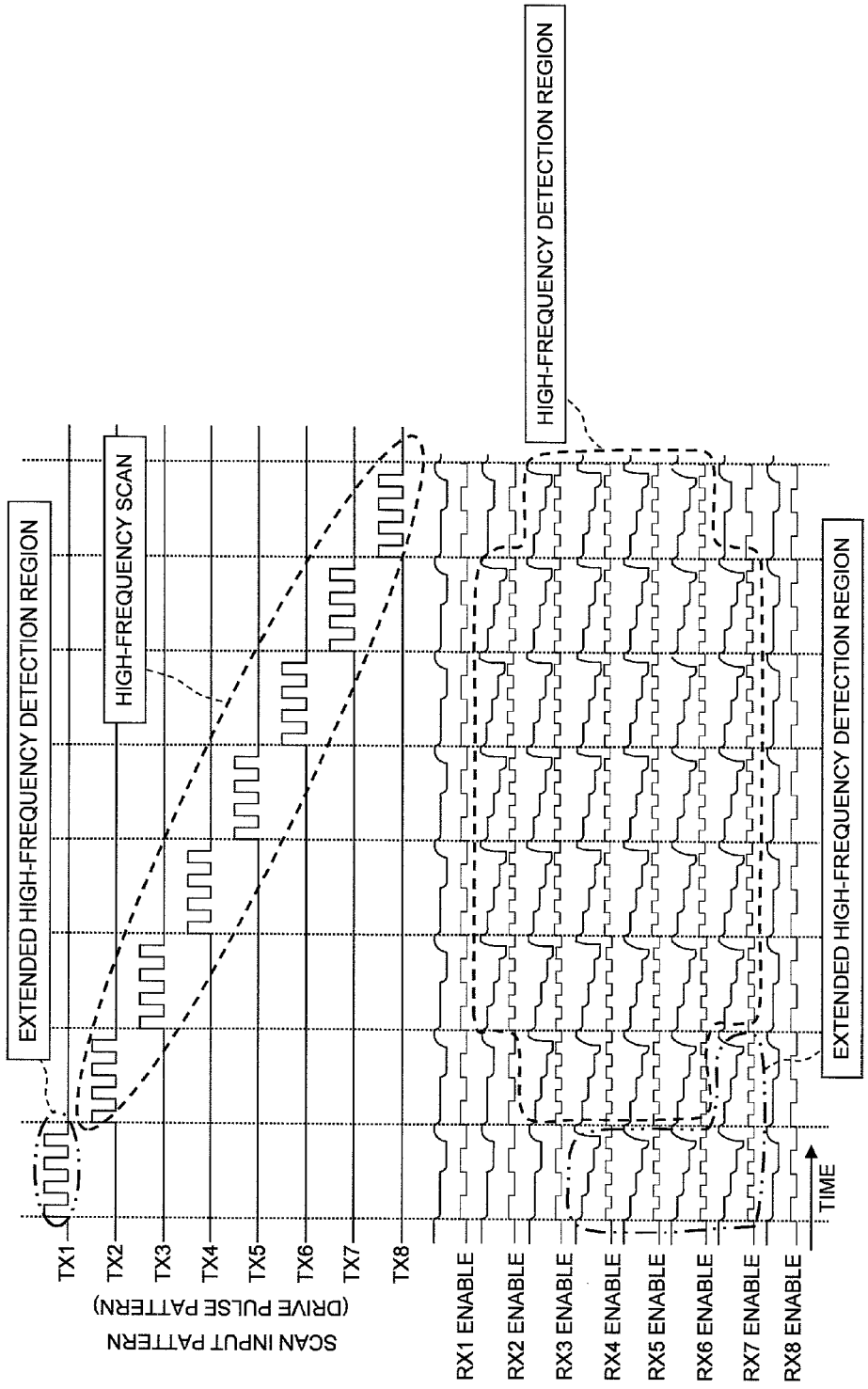
FIG. 9 is a timing waveform diagram showing, by example, driving waveforms in connection with the timing controller which uses high-frequency designation data created according to the second creation form to perform high-frequency driving only in a range designated by high-frequency designation data as described with reference to FIG. 5.

FIG. 9 shows, by example, driving waveforms in connection with the timing controller 34 which uses high-frequency designation data 40 created according to the second creation form to perform high-frequency driving only in a range designated by the high-frequency designation data as described with reference to FIG. 5.

Now, with Reference to FIGS. 10 to 14, the creation of the high-frequency designation data 40 in the touch panel controller of FIG. 8 will be described concretely.

Figure 13:
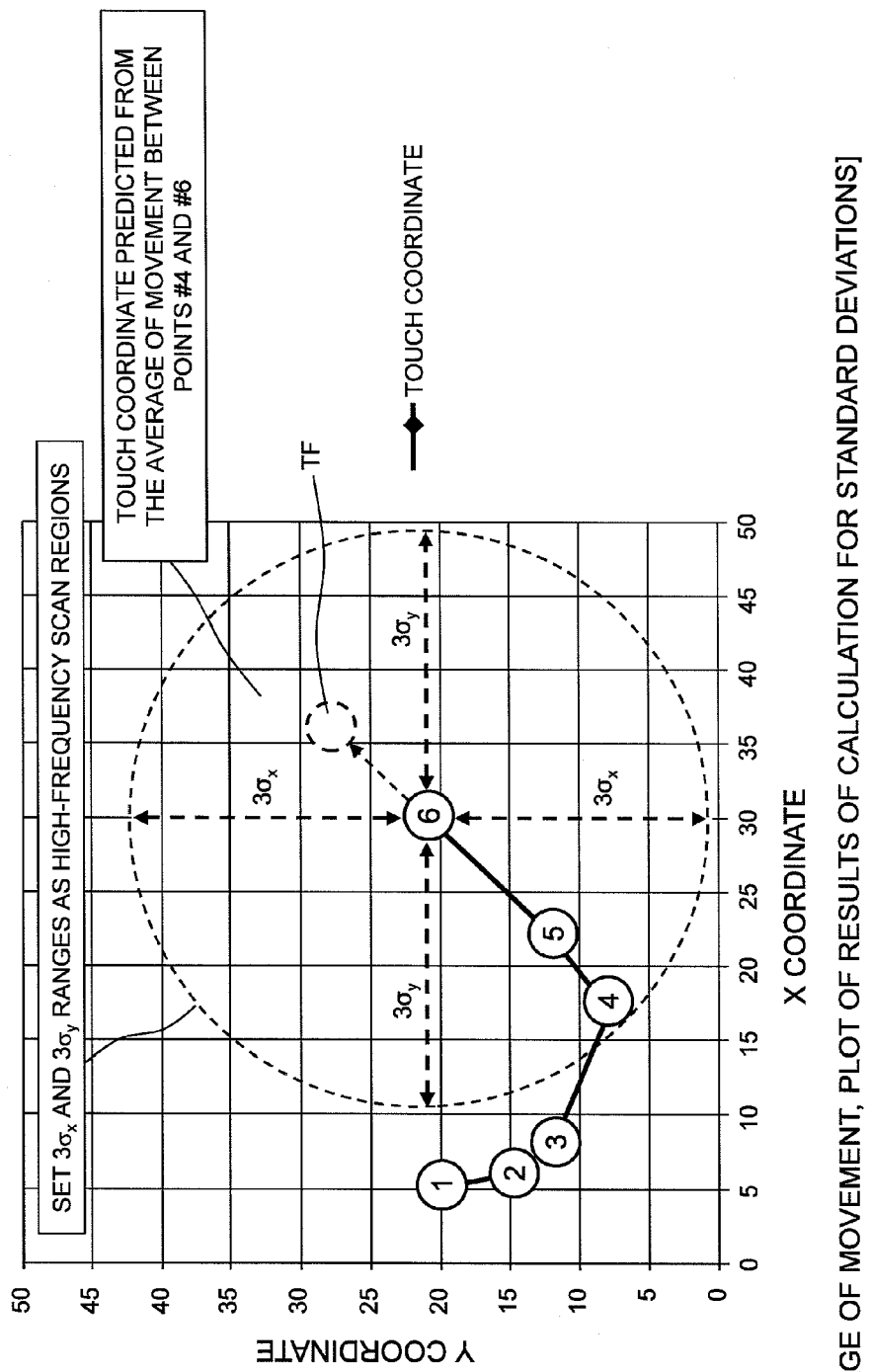
FIG. 13 is an explanatory diagram prepared by drawing a region to set for a high-frequency detection region on FIG. 11, in which the region to set for a high-frequency detection region is determined from the standard deviation σ based on data of FIG. 12.
Figure 14:
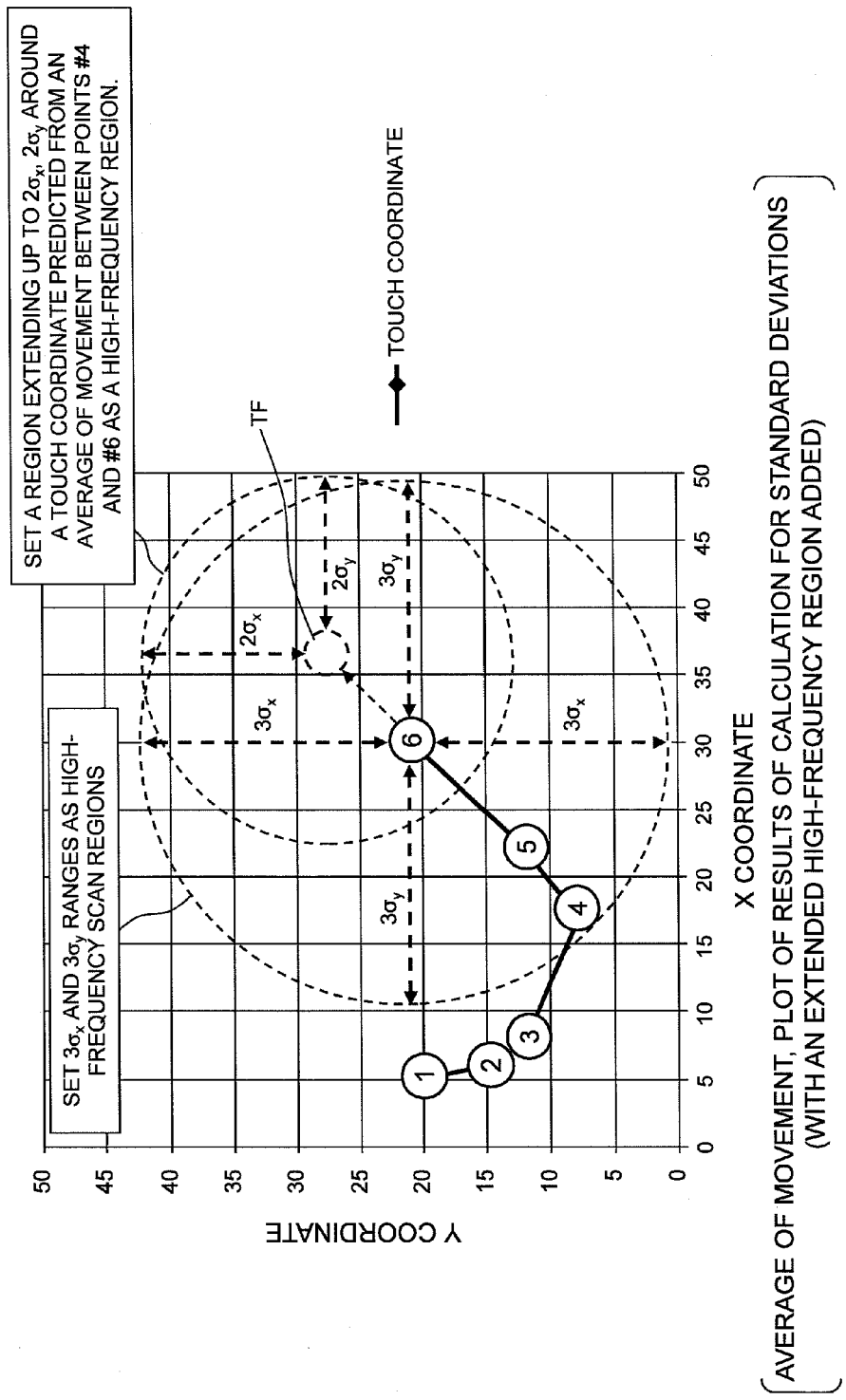
FIG. 14 is an explanatory diagram showing a 2σ range of a next predicted touch coordinate TF to a current touch coordinate of FIG. 13 in addition to a high-frequency-sensing region.

FIG. 10 shows, by example, coordinates obtained by six times of sensing every 30 ms. In FIG. 11, the coordinates are plotted in position with the horizontal axis for X coordinates, and the vertical axis for Y coordinates. FIG. 12 shows, by example, results of calculation on averages of movement, and standard deviations which are determined with coordinates of FIG. 11. FIG. 13 is obtained by adding, to FIG. 11, a region to set as a high-frequency detection region from the standard deviations σ determined herein. In FIG. 13, a next predicted touch coordinate TF with respect to a current touch coordinate labeled with "6" is given as follows: TF(x,y)=(38,30). FIG. 13 with a range of 2σ of the predicted touch coordinate TF added to a high-frequency sensing region makes FIG. 14.

The example of FIG. 8 brings about the effect and advantage as described below.

By using, as a next touch-prediction range, a range which centers at the current position and is two or more times as large as the standard deviation, the probability that a next touch position is included in a prediction range to perform high-frequency detection can be increased from the viewpoint of statistics.

A range which centers at a position predicted by extrapolation and is two or more times as large as the standard deviation is added to a next touch-prediction range, whereby the viewpoint of prediction by extrapolation is added to the viewpoint of statistics. Thus, the probability that a next touch position is included in a prediction range to perform high-frequency detection can be increased.

By using a predetermined range centering at a position predicted by extrapolation as the next touch-prediction range, the probability that the next touch position is included in a prediction range to perform the high-frequency detection can be increased from the viewpoint of prediction by extrapolation can be increased.

In any case, a correct coordinate position can be detected with a high-frequency detection region minimized even in a situation such that a touch coordinate is moved. It is obvious that the action of low power consumption can be realized.

It is obvious that the technical means whose description is omitted here, and which has been described in connection with the preceding examples can be applied to the example of the touch panel controller of FIG. 8 as required.

<<Another Control Form of a High-Frequency Region>>

As a form of controlling the drive frequency for a high-frequency region, and the sampling frequency, still another control form described below may be adopted.

For instance, the pulse frequency of a drive pulse pattern for each of the drive electrodes TX1 to TXm, and a sampling frequency of signal change for each of the detection electrodes RX1 to RXn are used as initial values until a touch coordinate is obtained; after having gained a touch coordinate, a pulse frequency of the drive pulse pattern for each of the drive electrode, and a sampling frequency of signal change for each of the detection electrodes are controlled to frequencies higher than the initial values within a predetermined range which is made variable depending on the touch coordinate according to the above-described control method; and after that, the pulse frequency of a drive pulse pattern and a sampling frequency of signal change are restored to the initial values in case that the touch position remains unchanged. According to the control form, the accuracy of touch detection is not kept high uselessly. In this respect, the touch panel controller is superior in low power consumption. The expression "the touch position remains unchanged" means any of the following cases as described above. The first is the touch panel remains untouched. The second is the touch panel becomes untouched after detection of touch, and then remains untouched. The third is a touch position is kept staying at the same coordinate even after a predetermined length of time has elapsed.

At this time, as long as the predetermined range of initial values is the whole range of the touch panel, wherever what type of operation of a flick and a drag is performed, a high level accuracy of touch detection can be ensured.

In addition, it is preferred to gradually spread the range of the predetermined range within which the pulse frequency and the sampling frequency are restored. Since the pulse frequency and the sampling frequency are gradually restored, and a high level accuracy of touch detection is not maintained uselessly, the touch panel controller is superior in low power consumption.

Further, the size of the predetermined range which is stepwise narrowed may be variable so that it can be changed by the setting on a parameter register of the timing controller 34. According to the arrangement like this, it becomes possible to make an optimum setting according to an action mode such as a low power consumption mode and high-speed working mode.

In this control form, the next touch-prediction range is made: a range which centers at a current position, and is two or more times as large as the standard deviation; a range which centers at a position predicted by extrapolation and is two or more times as large as the standard deviation; or a range which centers at a position predicted by extrapolation, and is within predetermined range. The above-described control technique can be applied to them.

The invention is not limited to the above embodiments. It is obvious that various changes and modifications may be made without departing from the subject matter thereof.

For instance, the control circuit operable to control the drive circuit and the detection circuit is not limited to a structure including a combination of a timing controller and a sensing-frequency-control circuit, nor a structure including a sensing-region-calculation circuit and a next-touch-coordinate-prediction-calculation circuit in addition to the combination of a timing controller and a sensing-frequency-control circuit. It may be changed or modified appropriately.

The semiconductor device may not include the subprocessor. The host processor may calculate touch coordinates instead.

The touch panel controller may not have the sensing-frequency-control circuit, the sensing-region-calculation circuit and the next-touch-coordinate-prediction-calculation circuit. In such a case, the functions of the subprocessor or host processor may be substituted for the functions of those circuits.

The control forms as described below can be arranged so that they can be selected by a mode register as a matter of course, otherwise only one of them may be adopted: a control form which includes the steps of raising the pulse frequency of a drive pulse pattern and raising the sampling frequency only near a touch position; a control form which includes the steps of raising the pulse frequency of all of drive pulse patterns, and raising the sampling frequency only near a touch position; or a control form which includes the steps of raising the pulse frequency of a drive pulse pattern only near a touch position, and increasing the sampling frequency of signal change according to the pulse frequency rise.

The predetermined range is reduced in size gradually until the high-frequency driving is restored. The execution unit of control before the pulse frequency and the sampling frequency are restored may be selected appropriately.

The semiconductor device need not have the display controller. The reason for this is the display controller will do even if it is externally mounted.

The high-frequency drive region need not be concentric circular necessarily, and it may have an appropriate shape to adapt to the next round of a touch coordinate predicted from accumulated measurement data.

What is claimed is:

1. A touch panel controller comprising:
   a drive circuit operable to output drive pulse patterns to drive electrodes of a touch panel sequentially;
   a detection circuit operable to detect signal changes arising on detection electrodes of the touch panel for each drive pulse pattern output by the drive circuit; and
   a control circuit operable to control the drive circuit and the detection circuit,
   wherein the drive circuit is capable of changing a pulse frequency of the drive pulse pattern for each drive electrode,
   the detection circuit is capable of changing a sampling frequency of signal change for each detection electrode, and
   the control circuit controls, within a predetermined range, a pulse frequency of the drive pulse pattern for each drive electrode, and a sampling frequency of signal change for each detection electrode so as to raise the pulse and sampling frequencies, provided that the predetermined range can be changed depending on a touch position where a touch has been detected by use of a detection signal detected by the detection circuit.

2. The touch panel controller according to claim 1, wherein the control circuit makes a pulse frequency of the drive pulse pattern a first pulse frequency, and a sampling frequency of signal change a first sampling frequency until a touch position is acquired; and on condition that the control circuit acquires and keeps a touch position, a pulse frequency of the drive pulse pattern for the drive electrodes depending on the predetermined range is a second pulse frequency higher than the first pulse frequency, and a sampling frequency of signal change from the detection electrode depending on the predetermined range is a second sampling frequency higher than the first sampling frequency.

3. The touch panel controller according to claim 1, wherein the control circuit makes a pulse frequency of the drive pulse pattern a first pulse frequency, and a sampling frequency of signal change a first sampling frequency until a touch position is acquired; and on condition that the control circuit acquires and keeps a touch position, a pulse frequency of the drive pulse pattern for all the drive electrodes is a second pulse frequency higher than the first pulse frequency, and a sampling frequency of signal change from the detection electrode depending on the predetermined range is a second sampling frequency higher than the second sampling frequency.

4. The touch panel controller according to claim 1, wherein the control circuit makes a pulse frequency of the drive pulse pattern a first pulse frequency, and a sampling frequency of signal change a first sampling frequency until a touch position is acquired;

on condition that the control circuit acquires and keeps a touch position, a pulse frequency of the drive pulse pattern for the drive electrodes depending on the predetermined range is a second pulse frequency higher than the first pulse frequency; and a sampling frequency of signal change which the detection circuit detects corresponding to the drive pulse pattern by the second pulse frequency is a second sampling frequency which is higher than the first sampling frequency.

5. The touch panel controller according to claim 2, wherein the control circuit makes a pulse frequency of the drive pulse pattern the second pulse frequency, and changes a sampling frequency of signal change of the detection circuit to the second sampling frequency, and in case that the control circuit cannot acquire a new touch position until a predetermined length of time has elapsed, the control circuit returns a pulse frequency of the drive pulse pattern which has been the second pulse frequency to the first pulse frequency, and returns the sampling frequency which has been the second sampling frequency to the first sampling frequency.

6. The touch panel controller according to claim 3, wherein the control circuit makes a pulse frequency of the drive pulse pattern the second pulse frequency, and makes a sampling frequency of signal change of the detection circuit a second sampling frequency, after that, in case that the control circuit cannot acquire a new touch position until a predetermined length of time has elapsed, the control circuit returns a pulse frequency of the drive pulse pattern which has been the second pulse frequency to the first pulse frequency, and returns the sampling frequency which has been the second sampling frequency to the first sampling frequency.

7. The touch panel controller according to claim 4, wherein the control circuit makes a pulse frequency of the drive pulse pattern the second pulse frequency, and makes a sampling frequency of signal change of the detection circuit the second sampling frequency, after that, in case that the control circuit cannot acquire a new touch position until a predetermined length of time has elapsed, the control circuit returns a pulse frequency of the drive pulse pattern which has been the second pulse frequency to the first pulse frequency, and returns the sampling frequency which has been the second sampling frequency to the first sampling frequency.

8. The touch panel controller according to claim 2, wherein the control circuit makes a pulse frequency of the drive pulse pattern the second pulse frequency, and makes a sampling frequency of signal change of the detection circuit the second sampling frequency, after that, in case that the control circuit cannot acquire a new touch position each time a predetermined length of time elapses, the control circuit successively makes smaller the predetermined range on each occasion thereby to adapt itself to the reduced range, returns back, to the first pulse frequency, the pulse frequency of a drive pulse pattern forming part of the drive pulse patterns which have been the second pulse frequency, and returns back, to the first sampling frequency, the sampling frequency forming part of the sampling frequencies which have been the second sampling frequency, at the time when finally, the number of elapses of the predetermined length of time reaches a final round number, the control circuit returns pulse frequencies of all the drive pulse patterns to the first pulse frequencies, and returns all the sampling frequencies to the first sampling frequencies, and in case that the control circuit obtains a new touch position on its way to the final round number, the control circuit performs control so as to return, to its initial range, the predetermined range for raising the pulse frequency of the drive pulse pattern and the sampling frequency of signal change.

9. The touch panel controller according to claim 3, wherein the control circuit makes a pulse frequency of the drive pulse pattern the second pulse frequency, and makes a sampling frequency of signal change of the detection circuit the second sampling frequency, after that, in case that the control circuit cannot acquire a new touch position each time a predetermined length of time elapses, the control circuit successively makes smaller the predetermined range on each occasion thereby to adapt itself to the reduced range, returns back, to the first pulse frequency, the pulse frequency of a drive pulse pattern forming part of the drive pulse patterns which have been the second pulse frequency, and returns back, to the first sampling frequency, the sampling frequency forming part of the sampling frequencies which have been the second sampling frequency, at the time when finally, the number of elapses of the predetermined length of time reaches a final round number, the control circuit returns pulse frequencies of all the drive pulse patterns to the first pulse frequencies, and returns all the sampling frequencies to the first sampling frequencies, and in case that the control circuit obtains a new touch position on its way to the final round number, the control circuit performs control so as to return, to its initial range, the predetermined range for raising the pulse frequency of the drive pulse pattern and the sampling frequency of signal change.

10. The touch panel controller according to claim 4, wherein the control circuit makes a pulse frequency of the drive pulse pattern the second pulse frequency, and makes a sampling frequency of signal change of the detection circuit the second sampling frequency, after that, in case that the control circuit cannot acquire a new touch position each time a predetermined length of time elapses, the control circuit successively makes smaller the predetermined range on each occasion thereby to adapt itself to the reduced range, returns back, to the first pulse frequency, the pulse frequency of a drive pulse pattern forming part of the drive pulse patterns which have been the second pulse frequency, and returns back, to the first sampling frequency, the sampling frequency forming part of the sampling frequencies which have been the second sampling frequency, at the time when finally, the number of elapses of the predetermined length of time reaches a final round number, the control circuit returns pulse frequencies of all the drive pulse patterns to the first pulse frequencies, and returns all the sampling frequencies to the first sampling frequencies, and in case that the control circuit obtains a new touch position on its way to the final round number, the control circuit performs control so as to return, to its initial range, the predetermined range for raising the pulse frequency of the drive pulse pattern and the sampling frequency of signal change.

11. The touch panel controller according to claim 1, wherein the predetermined range is a next touch-prediction range calculated from touch positions acquired just before.

12. The touch panel controller according to claim 11, wherein the next touch-prediction range centers at a touch position acquired just before, and is two or more times as large as a standard deviation calculated from touch positions acquired nearest.

13. The touch panel controller according to claim 12, wherein the next touch-prediction range is arranged by adding a range which centers at a touch position predicted by a predetermined extrapolation and which ranges up to two or more times as large as the standard deviation to a touch position acquired just before.

14. The touch panel controller according to claim 11 wherein the next touch-prediction range is a predetermined range centering at a touch position predicted by a predetermined extrapolation with respect to a touch position acquired just before.

15. A semiconductor device comprising:
the touch panel controller according to claim 1; and
a processor operable to calculate a coordinate of a touch position by use of a detection signal detected by the detection circuit,
wherein the control circuit acquires the touch position calculated by the processor.

16. The semiconductor device according to claim 15, further comprising:
a display controller operable to control, in display, a display panel,
wherein the touch panel controller controls the touch panel in synchronization with display control by the display controller.

17. A touch panel controller comprising:
a drive circuit operable to output drive pulse patterns to drive electrodes of a touch panel sequentially;
a detection circuit operable to detect signal changes arising on detection electrodes of the touch panel for each drive pulse pattern output by the drive circuit; and
a control circuit operable to control the drive circuit and the detection circuit,
wherein the drive circuit is capable of changing a pulse frequency of the drive pulse pattern for each drive electrode,
the detection circuit is capable of changing a sampling frequency of signal change for each detection electrode,
the control circuit uses, as initial values, the pulse frequency of the drive pulse pattern for each drive electrode, and the sampling frequency of signal change for each detection electrode until the control circuit obtains a touch position where a touch has been detected by use of detection signals provided by the detection circuit,
after having obtained a touch position, the control circuit controls the pulse frequency of the drive pulse pattern for each drive electrode, and the sampling frequency of signal change for each detection electrode to become frequencies higher than the initial values within a predetermined range which is made variable depending on the touch position, and
after that, the pulse frequency of the drive pulse pattern and the sampling frequency of signal change are restored into the initial values in case that the touch position remains unchanged.

18. The touch panel controller according to claim 17, wherein the control circuit stepwise narrows the predetermined range with time on condition that the touch position remains unchanged, thereby gradually widening a range for returning the pulse frequency of the drive pulse pattern and the sampling frequency of signal change back to their initial values.

19. The touch panel controller according to claim 17, wherein the initial value of the predetermined range is the whole range of the touch panel.

20. The touch panel controller according to claim 18, wherein the initial value of the predetermined range is the whole range of the touch panel.

21. The touch panel controller according to claim 17, wherein the size to stepwise narrow the predetermined range to can be changed by setting of a register to which an access from outside can be made.

22. The touch panel controller according to claim 18, wherein the size to stepwise narrow the predetermined range to can be changed by setting of a register to which an access from outside can be made.

23. A touch panel controller comprising:
a drive circuit operable to output drive pulse patterns to drive electrodes of a touch panel sequentially;
a detection circuit operable to detect signal changes arising on detection electrodes of the touch panel for each drive pulse pattern output by the drive circuit; and
a control circuit operable to control the drive circuit and the detection circuit,
wherein the drive circuit is capable of changing a pulse frequency of the drive pulse pattern for each drive electrode,
the detection circuit is capable of changing a sampling frequency of signal change for each detection electrode,
the control circuit uses, as initial values, the pulse frequency of the drive pulse pattern for each drive electrode, and the sampling frequency of signal change for each detection electrode until the control circuit obtains a touch position where a touch has been detected by use of detection signals provided by the detection circuit, after having obtained a touch position, the control circuit controls the pulse frequency of the drive pulse pattern for each drive electrode, and the sampling frequency of signal change for each detection electrode to become frequencies higher than the initial values within a predetermined range which can be changed depending on the prediction from a previous touch position obtained by use of a detection signal by the detection circuit.

24. The touch panel controller according to claim 23 wherein, the variable predetermined range is a next touch-prediction range calculated from touch positions acquired nearest.

25. The touch panel controller according to claim 24, wherein the next touch-prediction range is a range which centers at a touch position acquired just before, and is two or more times as large as the standard deviation calculated from touch positions acquired nearest.

26. The touch panel controller according to claim 25, wherein the next touch-prediction range is a range which centers at a touch position predicted by a predetermined extrapolation to a touch position acquired just before, and is two or more times as large as the standard deviation.

27. The touch panel controller according to claim 24, wherein the next touch-prediction range is a predetermined range which centers at a touch position predicted by a predetermined extrapolation to a touch position acquired just before.

* * * * *